US009475431B2

(12) United States Patent
Brummel et al.

(10) Patent No.: US 9,475,431 B2
(45) Date of Patent: Oct. 25, 2016

(54) REARVIEW MIRROR ASSEMBLY

(71) Applicant: MAGNA MIRRORS OF AMERICA, INC., Holland, MI (US)

(72) Inventors: Mark R. Brummel, Jenison, MI (US); Darryl P. De Wind, West Olive, MI (US); Gregory A. Huizen, Hudsonville, MI (US)

(73) Assignee: MAGNA MIRRORS OF AMERICA, INC., Holland, MI (US)

( * ) Notice: Subject to any disclaimer, the term of this patent is extended or adjusted under 35 U.S.C. 154(b) by 258 days.

(21) Appl. No.: 13/644,593

(22) Filed: Oct. 4, 2012

(65) Prior Publication Data

US 2013/0088884 A1    Apr. 11, 2013

Related U.S. Application Data

(60) Provisional application No. 61/663,840, filed on Jun. 25, 2012, provisional application No. 61/554,017, filed on Nov. 1, 2011, provisional application No. 61/543,492, filed on Oct. 5, 2011.

(51) Int. Cl.
    *B60R 1/04* (2006.01)
(52) U.S. Cl.
    CPC ...................................... *B60R 1/04* (2013.01)
(58) Field of Classification Search
    CPC ........ B60Q 1/2665; B60Q 3/023; B60R 1/04
    USPC ......................................................... 362/494
    See application file for complete search history.

(56) References Cited

U.S. PATENT DOCUMENTS

| 1,096,452 | A | 5/1914 | Perrin |
| 1,563,258 | A | 11/1925 | Cunningham |
| 2,457,348 | A | 12/1948 | Chambers |
| 2,561,582 | A | 7/1951 | Marbel |
| 3,887,788 | A | 6/1975 | Seibel et al. |
| 4,274,078 | A | 6/1981 | Isobe et al. |
| 4,733,335 | A | 3/1988 | Serizawa et al. |
| 4,803,599 | A | 2/1989 | Trine et al. |
| 4,931,627 | A | 6/1990 | Watts |
| 4,936,533 | A | 6/1990 | Adams et al. |
| 5,014,167 | A | 5/1991 | Roberts |
| 5,016,996 | A | 5/1991 | Ueno |
| 5,017,903 | A | 5/1991 | Krippelz, Sr. |

(Continued)

FOREIGN PATENT DOCUMENTS

| CA | 2028461 | 11/1994 |
| EP | 0450162 | 10/1994 |

(Continued)

*Primary Examiner* — Sean Gramling
*Assistant Examiner* — Gerald J Sufleta, II
(74) *Attorney, Agent, or Firm* — Gardner, Linn, Burkhart & Flory, LLP

(57) ABSTRACT

A rearview mirror assembly includes a mirror reflective element, a front mirror casing portion configured to receive the mirror reflective element, a rear mirror casing and a mirror backplate. The mirror backplate includes a generally planar attachment portion for attaching at a rear surface of the mirror reflective element and includes a perimeter flange circumscribing a perimeter of the generally planar attachment portion. The perimeter flange is partially received in the rear mirror casing portion and partially received in the front mirror casing portion, and the perimeter flange couples the front and rear mirror casing portions to the mirror backplate.

21 Claims, 16 Drawing Sheets

(56) References Cited

U.S. PATENT DOCUMENTS

| | | | |
|---|---|---|---|
| 5,059,015 A | 10/1991 | Tran |
| 5,066,112 A | 11/1991 | Lynam et al. |
| 5,100,095 A | 3/1992 | Haan et al. |
| 5,151,824 A | 9/1992 | O'Farrell |
| 5,207,492 A | 5/1993 | Roberts |
| 5,313,335 A | 5/1994 | Gray et al. |
| 5,355,284 A | 10/1994 | Roberts |
| 5,361,190 A | 11/1994 | Roberts et al. |
| 5,371,659 A | 12/1994 | Pastrick et al. |
| 5,402,103 A | 3/1995 | Tashiro |
| 5,436,741 A | 7/1995 | Crandall |
| D363,920 S | 11/1995 | Roberts et al. |
| 5,481,409 A | 1/1996 | Roberts |
| 5,497,305 A | 3/1996 | Pastrick et al. |
| 5,497,306 A | 3/1996 | Pastrick |
| 5,528,422 A | 6/1996 | Roberts |
| 5,575,552 A | 11/1996 | Faloon et al. |
| 5,587,699 A | 12/1996 | Faloon et al. |
| 5,619,374 A | 4/1997 | Roberts |
| 5,619,375 A | 4/1997 | Roberts |
| 5,632,551 A | 5/1997 | Roney et al. |
| 5,659,423 A | 8/1997 | Schierbeek et al. |
| 5,669,698 A | 9/1997 | Veldman et al. |
| 5,669,699 A | 9/1997 | Pastrick et al. |
| 5,669,704 A | 9/1997 | Pastrick |
| 5,669,705 A | 9/1997 | Pastrick et al. |
| D394,833 S | 6/1998 | Muth |
| 5,788,357 A | 8/1998 | Muth et al. |
| 5,796,176 A | 8/1998 | Kramer et al. |
| 5,798,575 A | 8/1998 | O'Farrell et al. |
| 5,818,625 A | 10/1998 | Forgette et al. |
| 5,820,097 A | 10/1998 | Spooner |
| 5,823,654 A | 10/1998 | Pastrick et al. |
| 5,825,527 A | 10/1998 | Forgette et al. |
| 5,863,116 A | 1/1999 | Pastrick et al. |
| 5,879,074 A | 3/1999 | Pastrick |
| D409,540 S | 5/1999 | Muth |
| 5,938,320 A | 8/1999 | Crandall |
| 5,959,367 A | 9/1999 | O'Farrell et al. |
| 6,005,724 A | 12/1999 | Todd |
| 6,007,222 A | 12/1999 | Thau |
| 6,045,243 A | 4/2000 | Muth et al. |
| D425,466 S | 5/2000 | Todd et al. |
| 6,064,508 A | 5/2000 | Forgette et al. |
| D426,506 S | 6/2000 | Todd et al. |
| D426,507 S | 6/2000 | Todd et al. |
| D427,128 S | 6/2000 | Mathieu |
| 6,074,077 A | 6/2000 | Pastrick et al. |
| 6,076,948 A | 6/2000 | Bukosky et al. |
| D428,372 S | 7/2000 | Todd et al. |
| D428,373 S | 7/2000 | Todd et al. |
| 6,086,229 A | 7/2000 | Pastrick |
| 6,093,976 A | 7/2000 | Kramer et al. |
| D428,842 S | 8/2000 | Todd et al. |
| D429,202 S | 8/2000 | Todd et al. |
| D430,088 S | 8/2000 | Todd et al. |
| 6,099,155 A | 8/2000 | Pastrick et al. |
| 6,111,683 A | 8/2000 | Cammenga et al. |
| 6,111,684 A | 8/2000 | Forgette et al. |
| 6,124,886 A | 9/2000 | DeLine et al. |
| 6,142,656 A | 11/2000 | Kurth |
| 6,146,003 A | 11/2000 | Thau |
| 6,149,287 A | 11/2000 | Pastrick et al. |
| 6,152,590 A | 11/2000 | Furst et al. |
| 6,163,083 A | 12/2000 | Kramer et al. |
| 6,166,848 A | 12/2000 | Cammenga et al. |
| 6,175,164 B1 | 1/2001 | O'Farrell et al. |
| 6,176,602 B1 | 1/2001 | Pastrick et al. |
| 6,193,379 B1 | 2/2001 | Tonar et al. |
| 6,195,194 B1 | 2/2001 | Roberts et al. |
| 6,227,689 B1 | 5/2001 | Miller |
| 6,244,716 B1 | 6/2001 | Steenwyk et al. |
| 6,257,746 B1 | 7/2001 | Todd et al. |
| 6,264,353 B1 | 7/2001 | Caraher et al. |
| 6,276,821 B1 | 8/2001 | Pastrick et al. |
| 6,280,069 B1 | 8/2001 | Pastrick et al. |
| 6,296,379 B1 | 10/2001 | Pastrick |
| 6,299,333 B1 | 10/2001 | Pastrick et al. |
| 6,318,870 B1 | 11/2001 | Spooner et al. |
| 6,329,925 B1 | 12/2001 | Skiver et al. |
| 6,336,737 B1 | 1/2002 | Thau |
| 6,340,849 B1 | 1/2002 | Kramer et al. |
| 6,340,850 B2 | 1/2002 | O'Farrell et al. |
| 6,347,880 B1 | 2/2002 | Furst et al. |
| 6,356,376 B1 | 3/2002 | Tonar et al. |
| 6,416,208 B2 | 7/2002 | Pastrick et al. |
| 6,426,485 B1 | 7/2002 | Bulgajewski et al. |
| 6,441,943 B1 | 8/2002 | Roberts et al. |
| 6,476,358 B1 | 11/2002 | Lang et al. |
| 6,483,438 B2 | 11/2002 | DeLine et al. |
| 6,502,970 B1 | 1/2003 | Anderson et al. |
| 6,540,193 B1 | 4/2003 | DeLine |
| 6,593,565 B2 | 7/2003 | Heslin et al. |
| 6,650,457 B2 | 11/2003 | Busscher et al. |
| 6,657,767 B2 | 12/2003 | Bonardi et al. |
| 6,690,268 B2 | 2/2004 | Schofield et al. |
| 6,717,109 B1 | 4/2004 | Macher et al. |
| 6,832,848 B2 | 12/2004 | Pastrick |
| 6,877,709 B2 | 4/2005 | March et al. |
| 7,184,190 B2 | 2/2007 | McCabe et al. |
| 7,249,860 B2 | 7/2007 | Kulas et al. |
| 7,255,451 B2 | 8/2007 | McCabe et al. |
| 7,274,501 B2 | 9/2007 | McCabe et al. |
| 7,287,868 B2 | 10/2007 | Carter et al. |
| 7,289,037 B2 | 10/2007 | Uken et al. |
| 7,334,922 B2 | 2/2008 | Bonardi et al. |
| 7,370,983 B2 | 5/2008 | De Wind et al. |
| 7,510,311 B2 | 3/2009 | Romas et al. |
| 7,626,749 B2 | 12/2009 | Baur et al. |
| 7,722,199 B2 * | 5/2010 | DeWard ............... B60R 1/04 248/481 |
| D633,019 S | 2/2011 | De Wind |
| D633,423 S | 3/2011 | De Wind |
| D638,761 S | 5/2011 | De Wind |
| D647,017 S | 10/2011 | De Wind |
| D660,208 S | 5/2012 | De Wind |
| D661,234 S | 6/2012 | De Wind |
| 8,287,164 B2 | 10/2012 | Fehn et al. |
| 2005/0281043 A1 | 12/2005 | Eisenbraun |
| 2006/0050018 A1 | 3/2006 | Hutzel et al. |
| 2006/0061008 A1* | 3/2006 | Karner ............... B29C 45/0017 264/250 |
| 2007/0081350 A1 | 4/2007 | Huang |
| 2009/0015736 A1 | 1/2009 | Weller et al. |
| 2009/0251785 A1 | 10/2009 | Bruhnke et al. |
| 2009/0251913 A1 | 10/2009 | Bruhnke et al. |
| 2010/0085653 A1* | 4/2010 | Uken ................. B60R 1/04 359/872 |
| 2010/0091509 A1* | 4/2010 | DeLine et al. ............... 362/494 |
| 2011/0096427 A1 | 4/2011 | Uken et al. |
| 2012/0026616 A1 | 2/2012 | Rawlings |
| 2012/0038964 A1 | 2/2012 | De Wind et al. |
| 2012/0236388 A1 | 9/2012 | De Wind et al. |

FOREIGN PATENT DOCUMENTS

| | | |
|---|---|---|
| EP | 1345071 | 9/2003 |
| GB | 2161440 | 1/1986 |
| JP | 6-81836 | 3/1997 |
| WO | WO2010/124064 | 10/2010 |
| WO | WO2011/044312 | 4/2011 |
| WO | WO2012/051500 | 4/2012 |

* cited by examiner

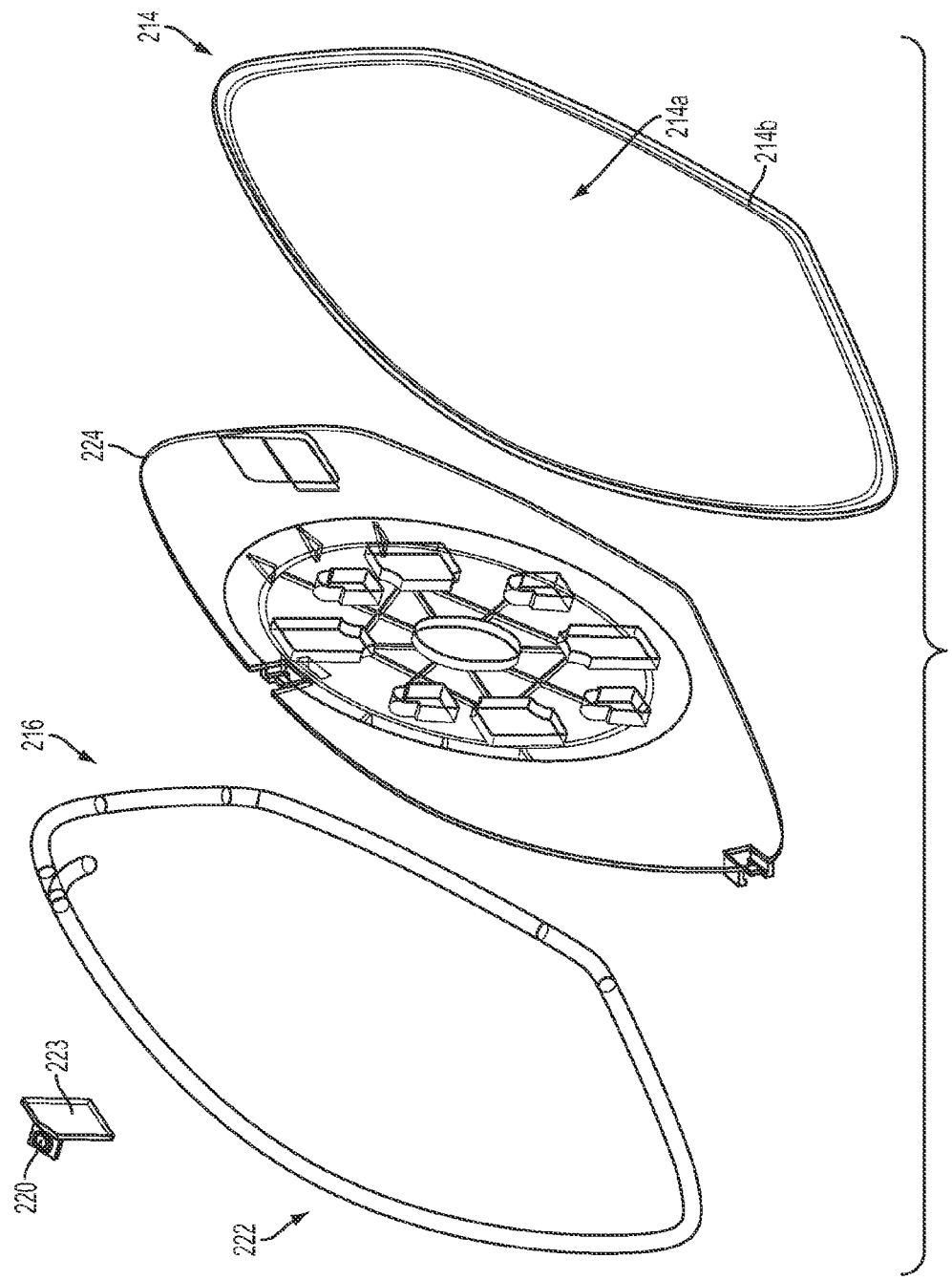

REARVIEW MIRROR ASSEMBLY

CROSS REFERENCE TO RELATED APPLICATIONS

The present application claims the filing benefit of U.S. provisional applications, Ser. No. 61/663,840, filed Jun. 25, 2012; Ser. No. 61/554,017, filed Nov. 1, 2011, and Ser. No. 61/543,492, filed Oct. 5, 2011, which are hereby incorporated herein by reference in their entireties.

FIELD OF THE INVENTION

The present invention relates generally to the field of interior rearview mirror assemblies for vehicles.

BACKGROUND OF THE INVENTION

Typically, an interior rearview mirror assembly includes a mirror reflective element that is attached to an attachment plate and at least partially received in a mirror casing, with a bezel portion snapped to the mirror casing so that the bezel portion and casing overlap or encompass a perimeter edge of the reflective element and a portion or perimeter region of an outer or front surface of the reflective element (the surface facing the driver of the vehicle when the mirror assembly is normally mounted in the vehicle). The reflective element is adjustable by the driver to adjust the rearward field of view provided by the mirror reflective element.

SUMMARY OF THE INVENTION

The present invention provides an interior rearview mirror assembly that has a backplate that is attachable to (such as via an adhesive or tape or the like) at a rear surface of a reflective element, with the backplate providing for a snap connection to a bezel and to a mirror casing of the interior rearview mirror assembly, and with the backplate having a socket element (for attaching to a ball member of a mounting arm) integrally formed therewith, such as via plastic molding.

The present invention also provides an interior rearview mirror assembly that has a mirror backplate that includes a generally planar attachment portion for attaching at a rear surface of the mirror reflective element and includes a perimeter flange circumscribing a perimeter of the generally planar attachment portion, with the perimeter flange partially received in a rear mirror casing portion and partially received in a front mirror casing portion, such that the perimeter flange couples the front and rear mirror casing portions to the mirror backplate.

These and other objects, advantages, purposes and features of the present invention will become apparent upon review of the following specification in conjunction with the drawings.

BRIEF DESCRIPTION OF THE DRAWINGS

FIG. 19 is an exploded perspective view of the lighting feature and reflective element of the exterior rearview mirror assembly of FIG. 18.

DESCRIPTION OF THE PREFERRED EMBODIMENTS

Figure 1:
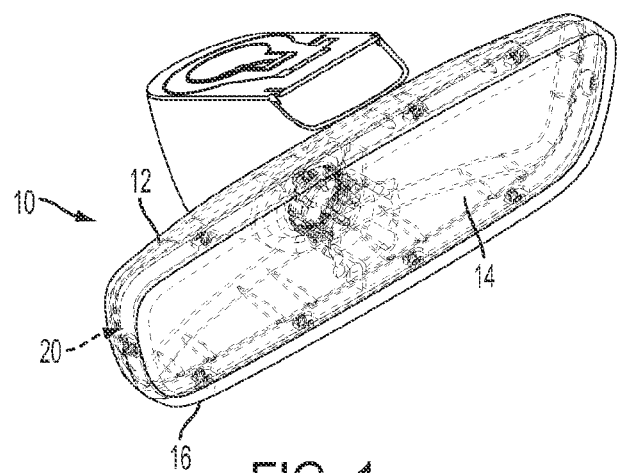
FIG. 1 is a perspective view of an interior rearview mirror assembly in accordance with the present invention.
Figure 2:
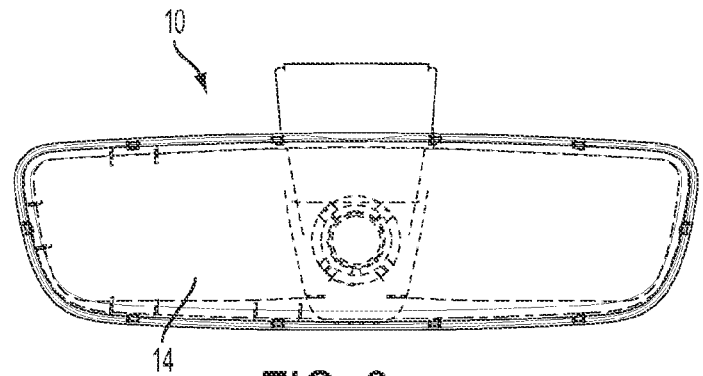
FIG. 2 is a front plan view of the interior rearview mirror assembly of FIG. 1.
Figures 3, 4:
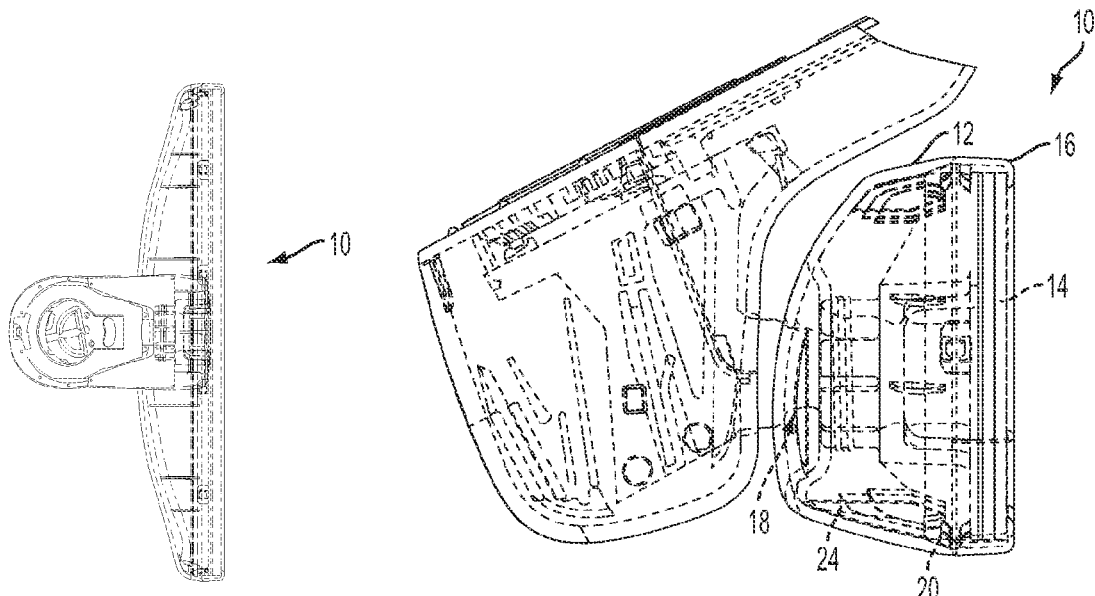
FIG. 3 is a top plan view of the interior rearview mirror assembly of FIG. 1.
FIG. 4 is a side elevation and partial sectional view of the interior rearview mirror assembly of FIG. 1.
Figure 5:
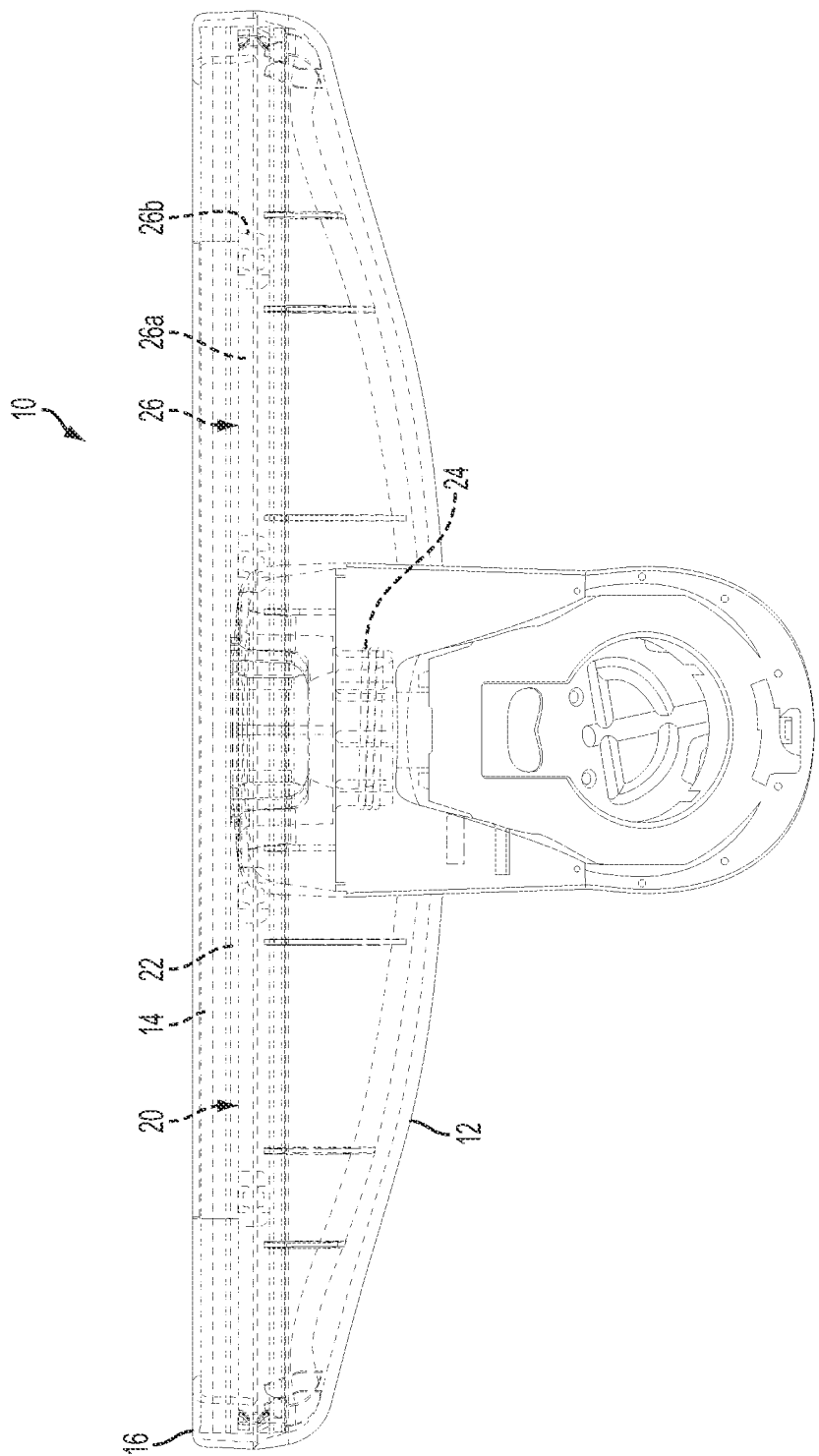
FIG. 5 is another top plan view of the interior rearview mirror assembly of FIG. 1.
Figure 6:
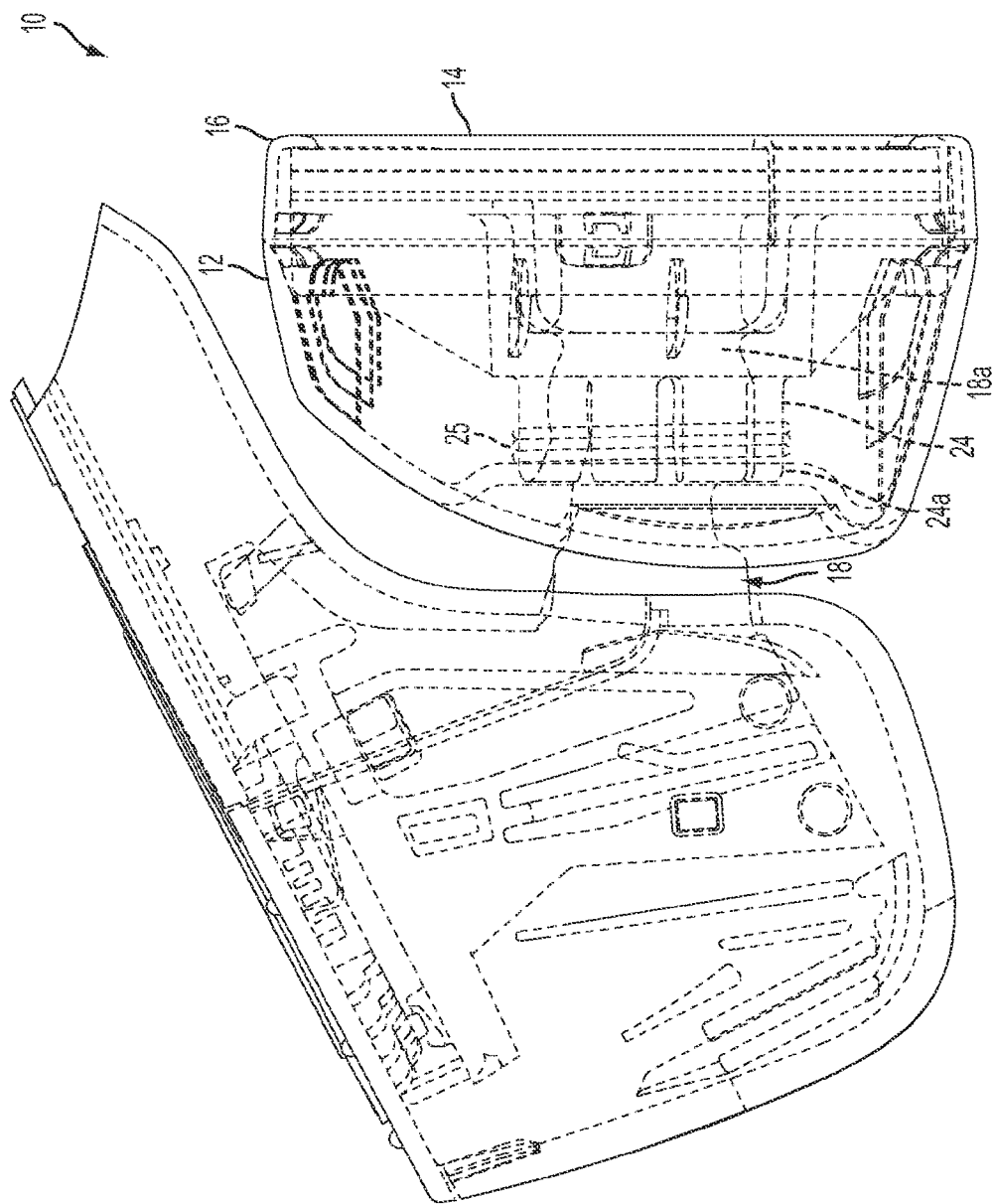
FIG. 6 is another side elevation and partial sectional view of the interior rearview mirror assembly of FIG. 1.
Figure 7:
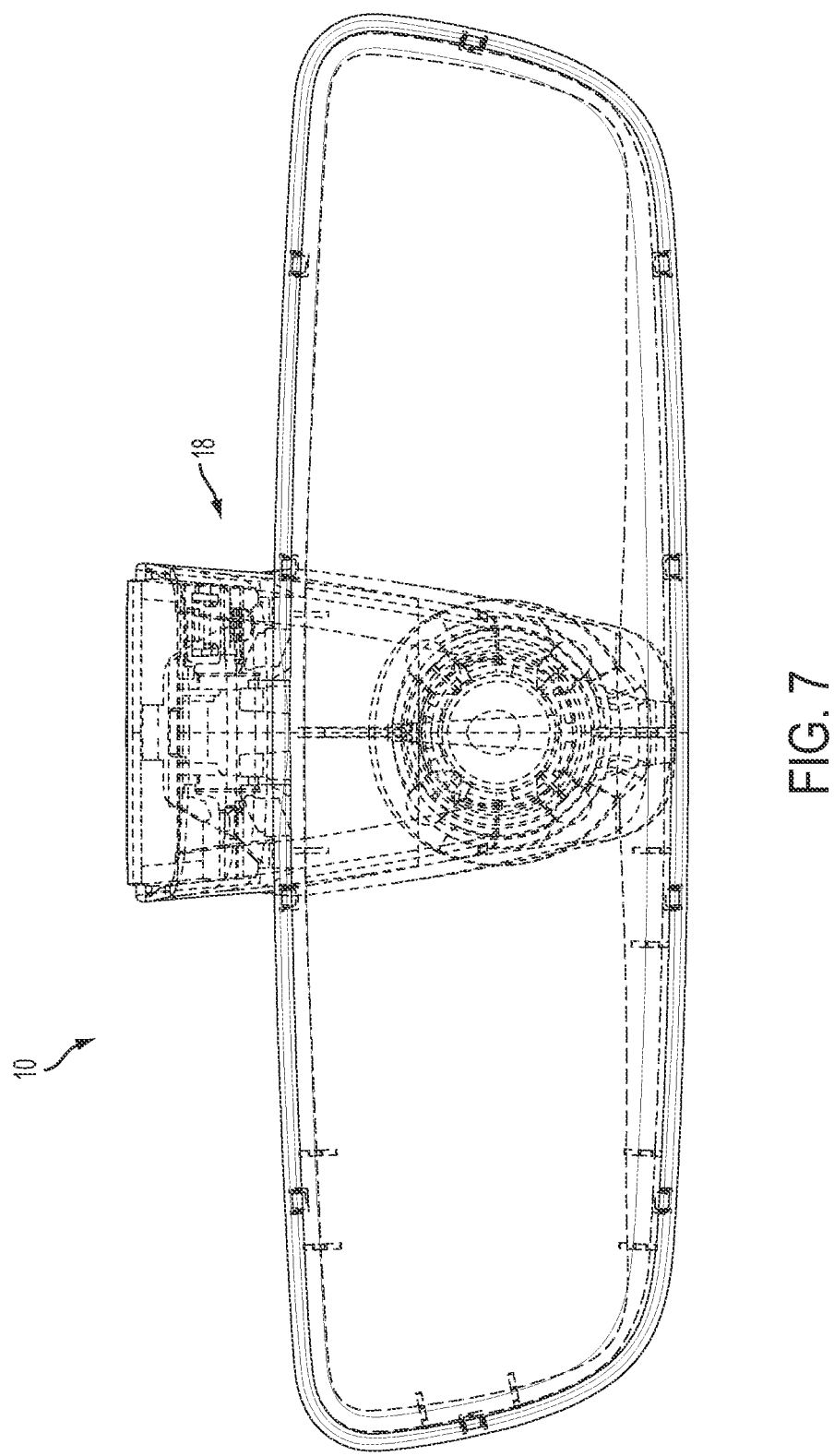
FIG. 7 is another plan view of the interior rearview mirror assembly of FIG. 1.
Figure 8:
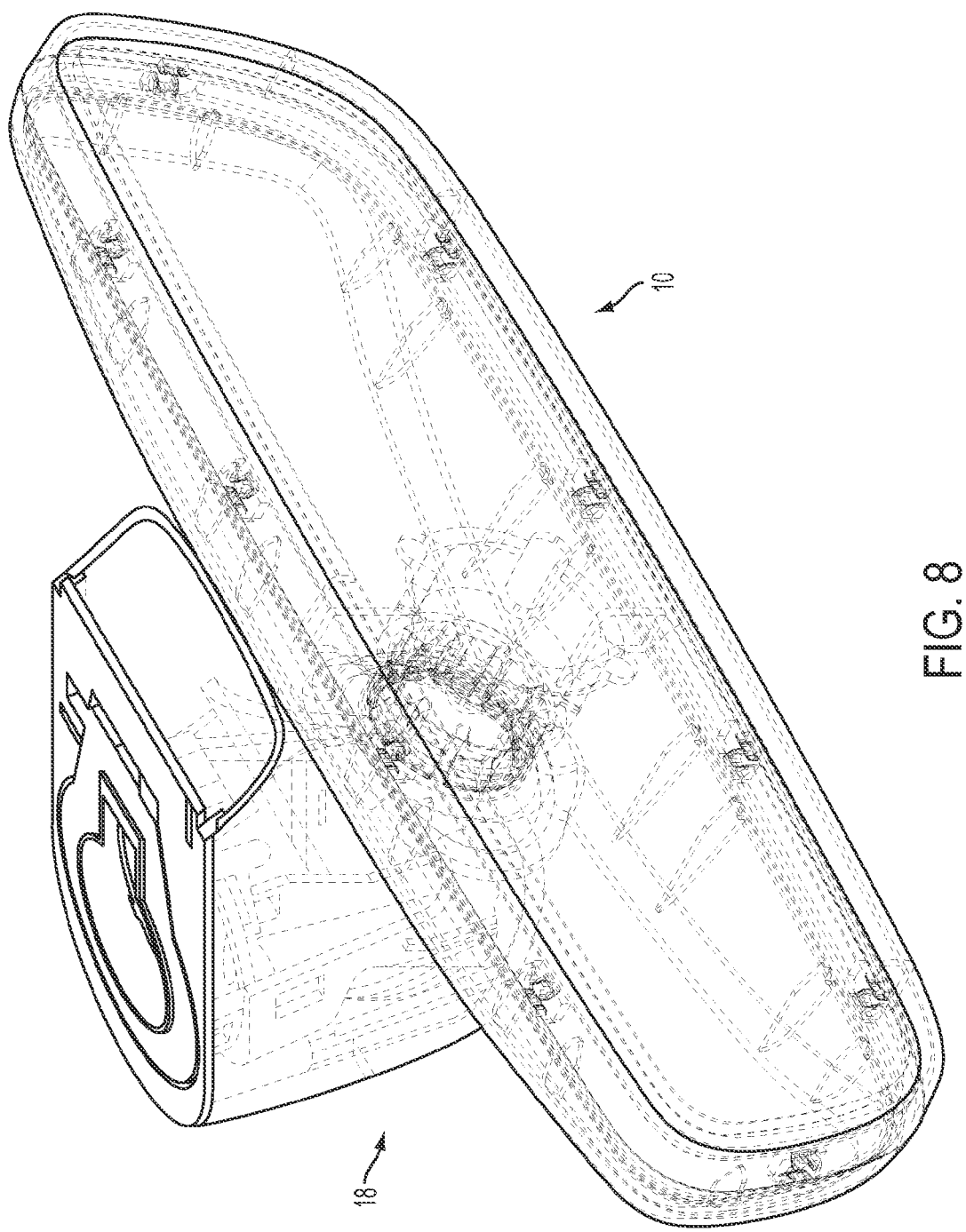
FIG. 8 is another perspective view of the interior rearview mirror assembly of FIG. 1.
Figure 9:
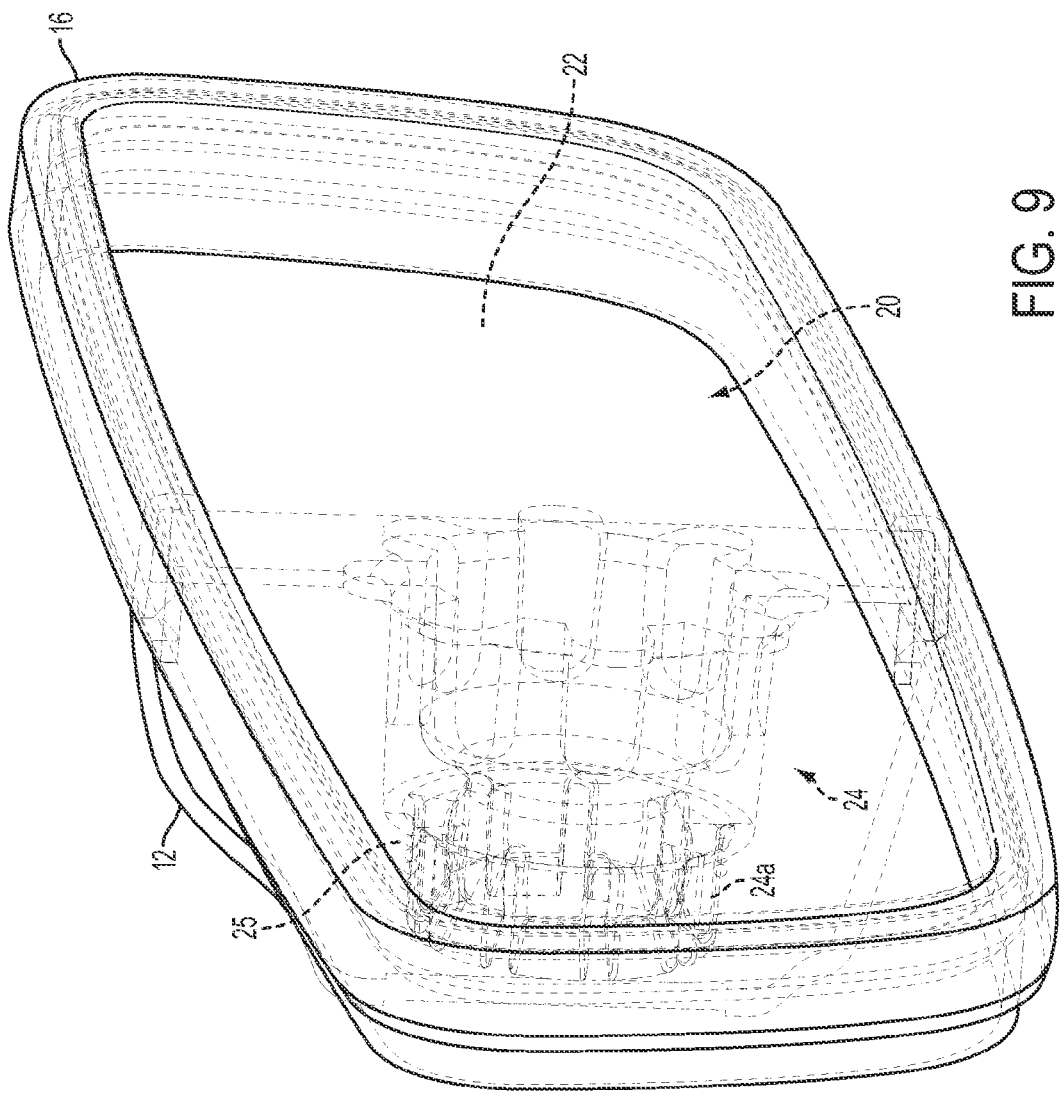
FIG. 9 is a rear perspective view of the mirror back plate and socket element of the interior rearview mirror assembly of FIG. 1.
Figure 10:
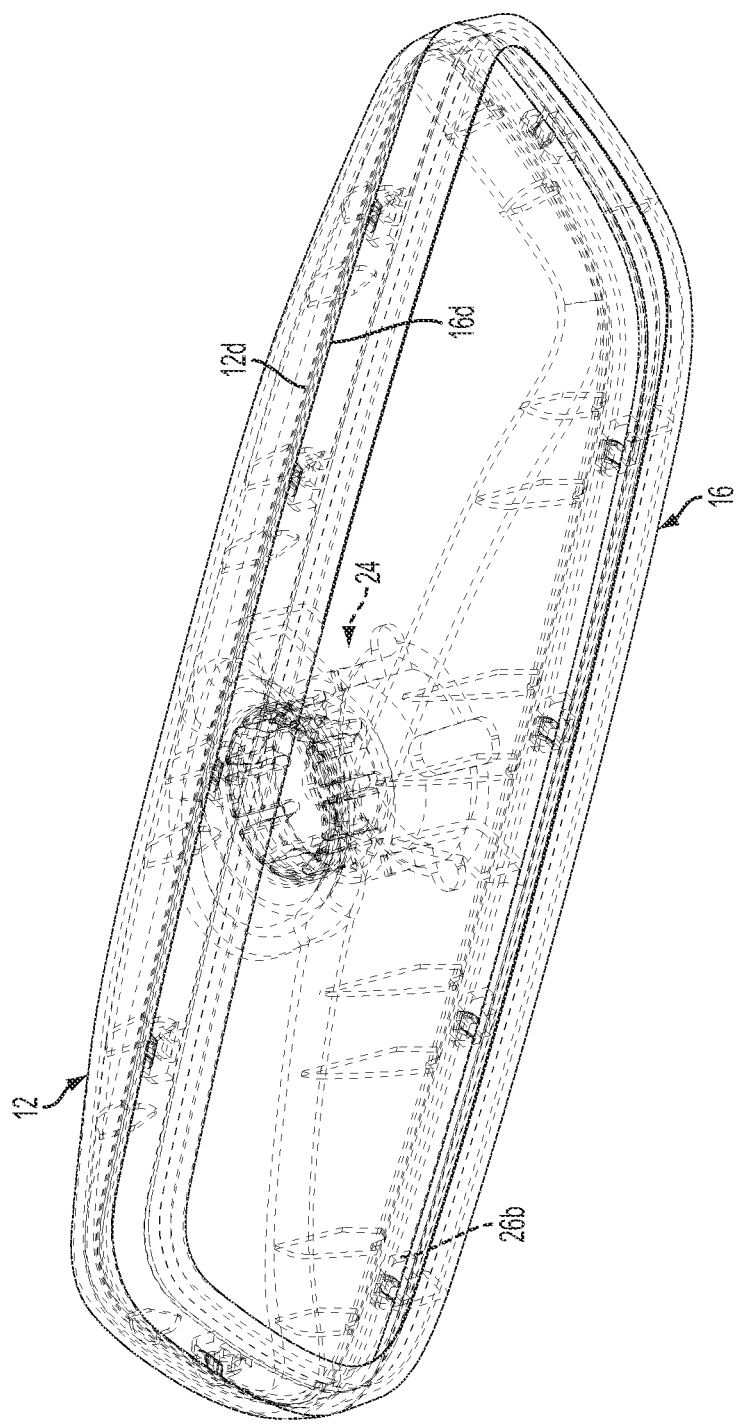
FIG. 10 is a front perspective view of the mirror front and rear casings and backplate shown assembled together.
Figure 11:
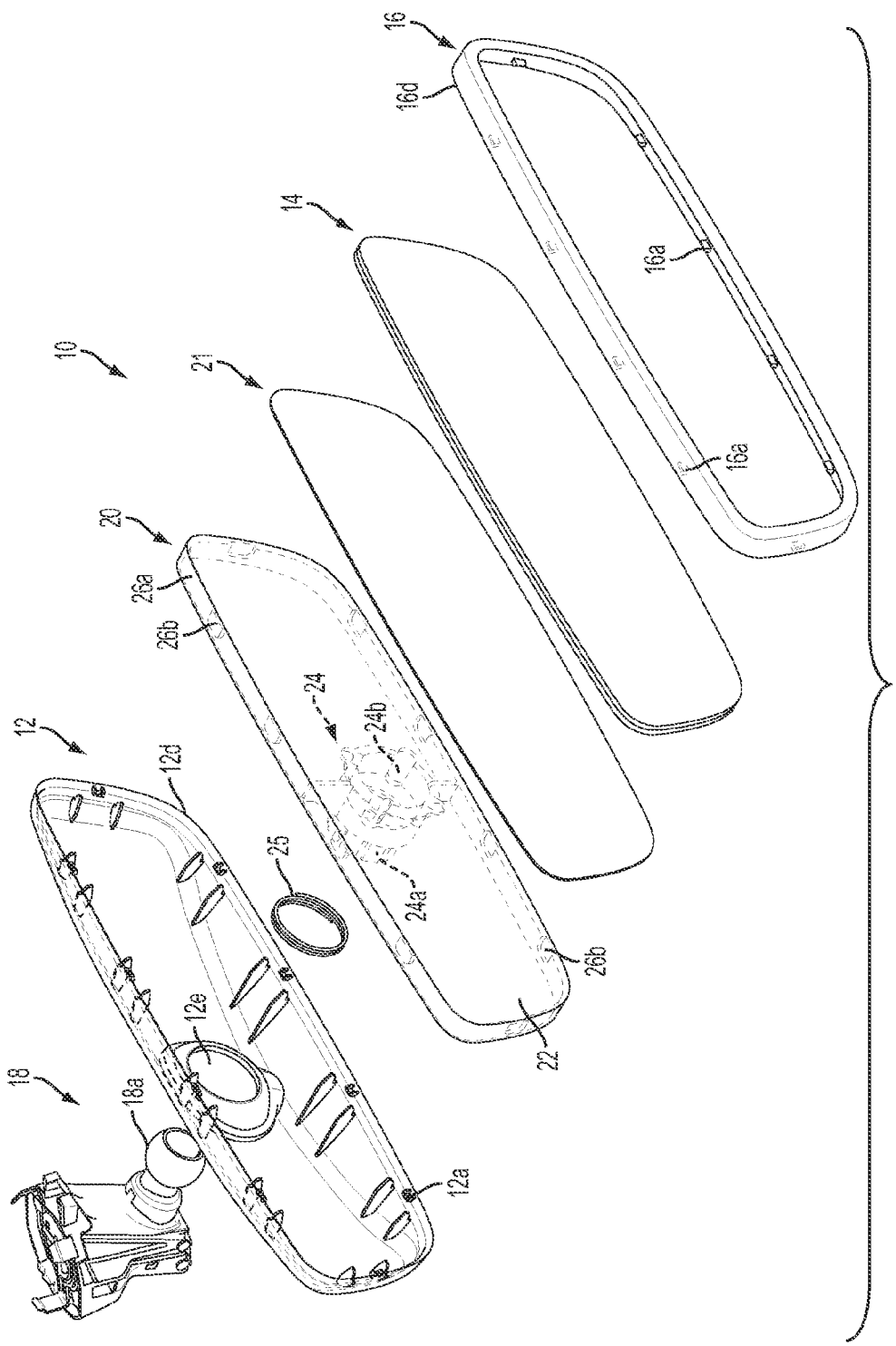
FIG. 11 is an exploded front perspective view of the interior rearview mirror assembly of FIG. 1.
Figure 12:
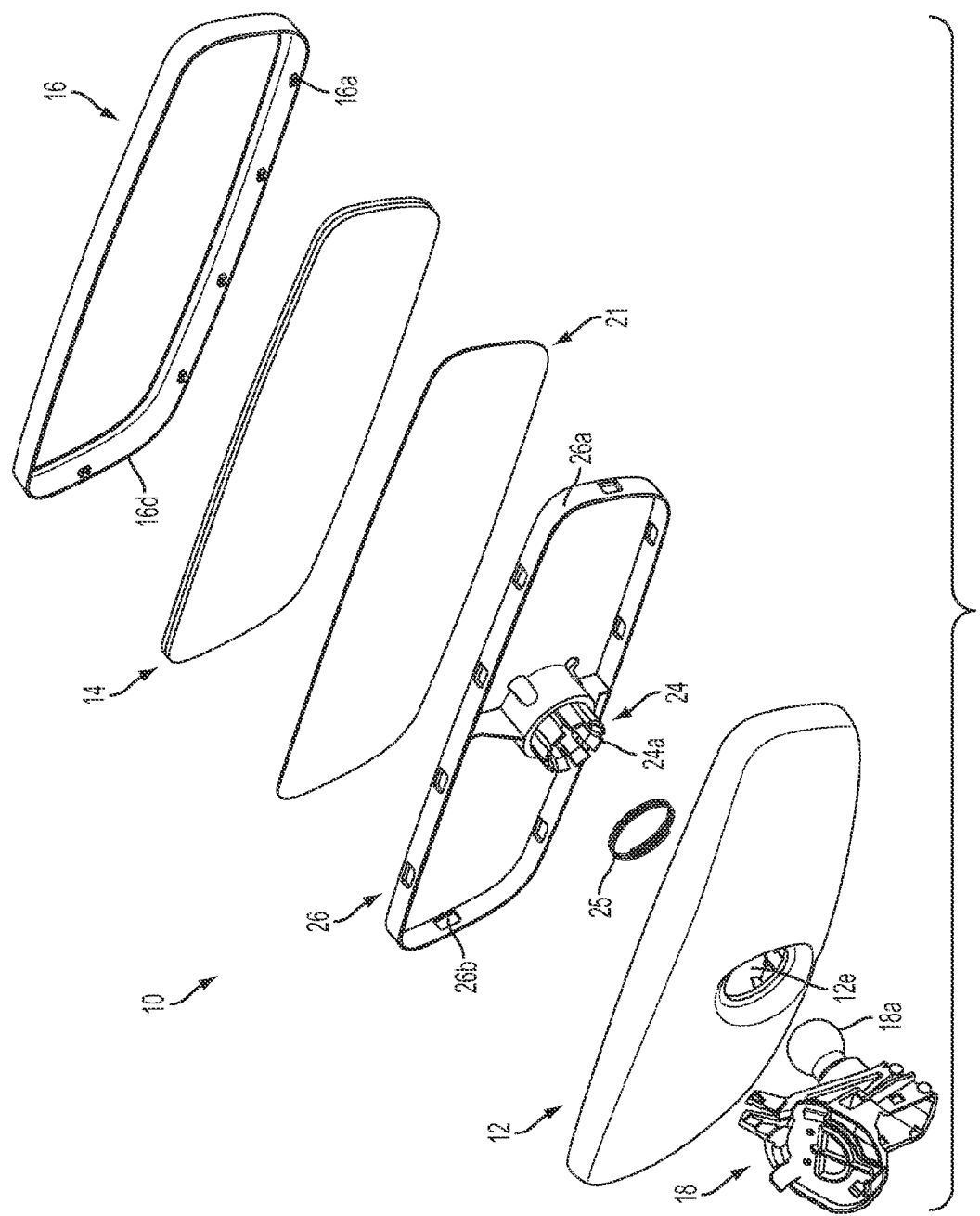
FIG. 12 is an exploded rear perspective view of the interior rearview mirror assembly of FIG. 1.
Figure 13:
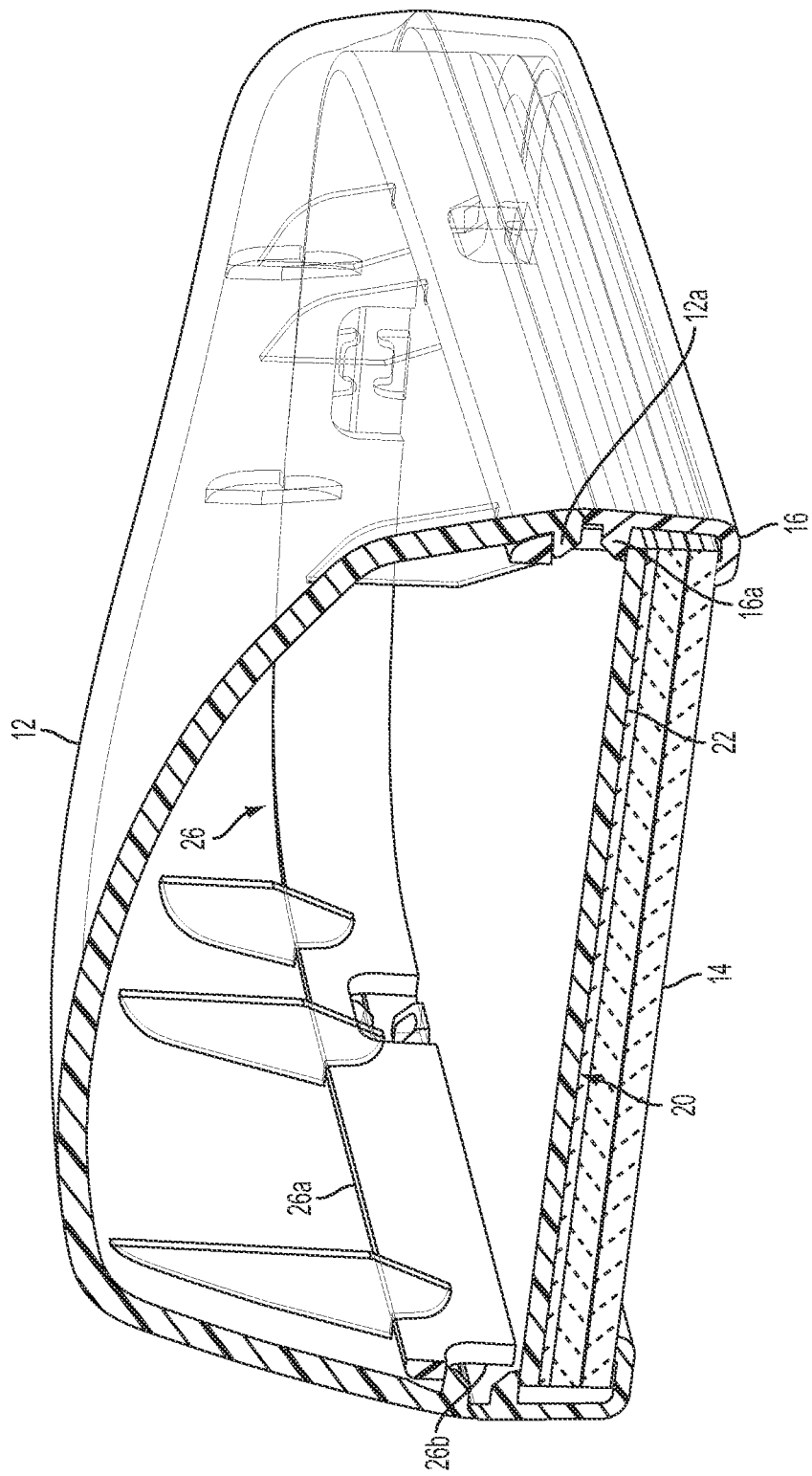
FIG. 13 is a perspective view and partial sectional view of the interior rearview mirror assembly of FIG. 1.

Referring now to the drawings and the illustrative embodiments depicted therein, an interior rearview mirror assembly 10 for a vehicle includes a mirror casing or housing or shroud or cap or holder 12, a reflective element 14 positioned at a front portion of the mirror casing 12 and a bezel or front casing portion 16 disposed around a periphery of the reflective element. Mirror assembly 10 is adjustably mounted to an interior portion of a vehicle (such as to an interior surface of a vehicle windshield or a headliner of a vehicle or the like) via a mounting structure or mounting configuration or assembly 18. The mirror assembly 10 includes a backplate 20 that is attached (such as via adhesive or tape 21 or the like) at the rear surface of the reflective element 14. The backplate 20 includes a generally planar attachment portion 22 (that is adhered or otherwise attached at the rear surface of the reflective element) and a pivot element 24 integrally formed, such as via injection molding of a plastic or polymeric or engineering plastic material or the like. The backplate 20 includes a perimeter attachment portion 26 that is attachable to the bezel element or front casing portion 16 and is attachable to a forward edge portion of the mirror casing or rear casing portion 12 to assemble the mirror assembly, as discussed below.

Backplate 20 comprises a unitarily molded part and includes the generally planar attachment portion 22 and pivot element 24 and perimeter attachment portion 26, all molded during the same molding process, such as during the same injection molding. In the illustrated embodiment, the perimeter attachment portion 26 comprises a flange or lip 26a extending around the perimeter of the generally planar mirror reflective element attachment portion 22, with the flange or lip 26a being sized so as to be received within a rear opening of the bezel or front casing portion 16 and a front opening of the rear casing portion 12. The perimeter attachment portion 26 includes a plurality of apertures or openings 26b established or spaced apart along the flange or lip 26a for attaching the backplate 20 to the bezel or front mirror casing portion 16 and to the rear mirror casing portion 12.

In the illustrated embodiment, and as best shown in FIGS. 8, 11 and 13-15, the front casing portion 16 includes a plurality of tabs or attaching elements 16a that are spaced apart along the perimeter of the front casing portion and that protrude radially inward so as to be received in respective apertures 26b of the flange 26a of backplate 20 to attach (such as by snapping into the apertures) the bezel or front casing portion 16 to the backplate 20. As best seen with reference to FIGS. 13-15, the flange 26a of backplate 20 is received in the rear opening of the bezel or front casing portion 16, whereby the front casing portion may flex to allow its tabs 16a to pass the front portion or edge region of the flange 26a and may return to its initial form as the tabs 16a are received in the respective apertures 26b of the flange 26a of backplate 20. The tabs 16a are formed with curved or slanted rear surfaces 16b to facilitate sliding of the tabs 16a over the front edge region of the flange 26a and include generally planar front surfaces 16c that engage the generally planar portion 22 of the backplate 20 to limit retraction of the backplate from the front casing portion when they are assembled together.

Likewise, the rear casing portion 12 includes a plurality of tabs or attaching elements 12a that are spaced apart along the perimeter of the rear casing portion and that protrude radially inward so as to be received in respective apertures 26b of the flange 26a of backplate 20 to attach (such as by snapping into the apertures) the rear casing portion 12 to the backplate 20. As best seen with reference to FIGS. 13-15, the flange 26a of backplate 20 is received in the front opening of the rear casing portion 12, whereby the rear casing portion may flex to allow its tabs 12a to pass the rear portion or edge region of the flange 26a and may return to its initial form as the tabs 12a are received in the respective apertures 26b of the flange 26a of backplate 20. The tabs 12a are formed with curved or slanted front surfaces 12b to facilitate sliding of the tabs 12a over the rear edge region of the flange 26a and include generally planar front surfaces 12c that engage a rear portion of the flange 26a of the backplate 20 at the rear of the apertures 26b to limit retraction of the backplate from the rear casing portion when they are assembled together.

Figure 14:
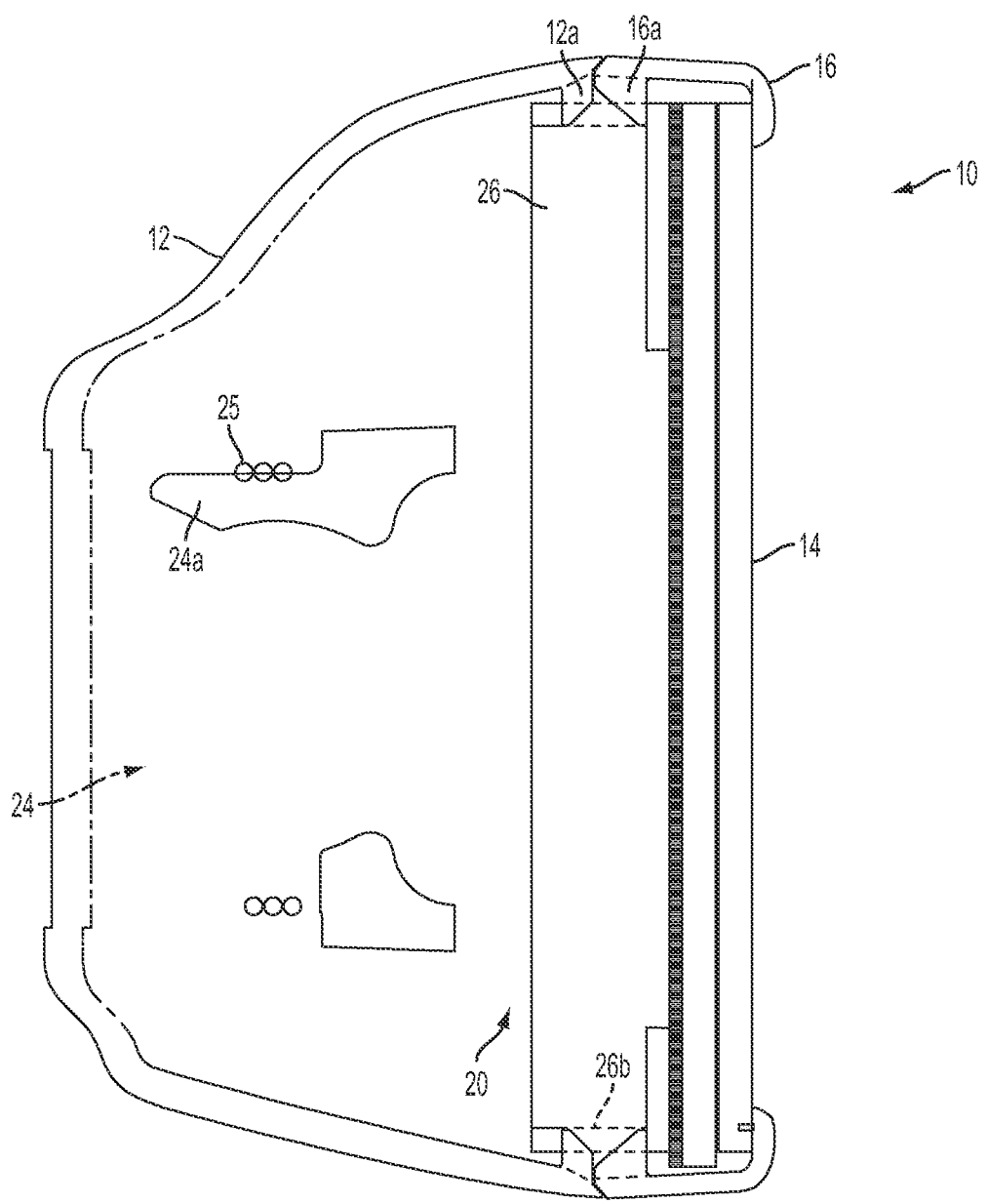
FIG. 14 is a side elevation and partial sectional view of the interior rearview mirror assembly of the present invention.
Figure 15:
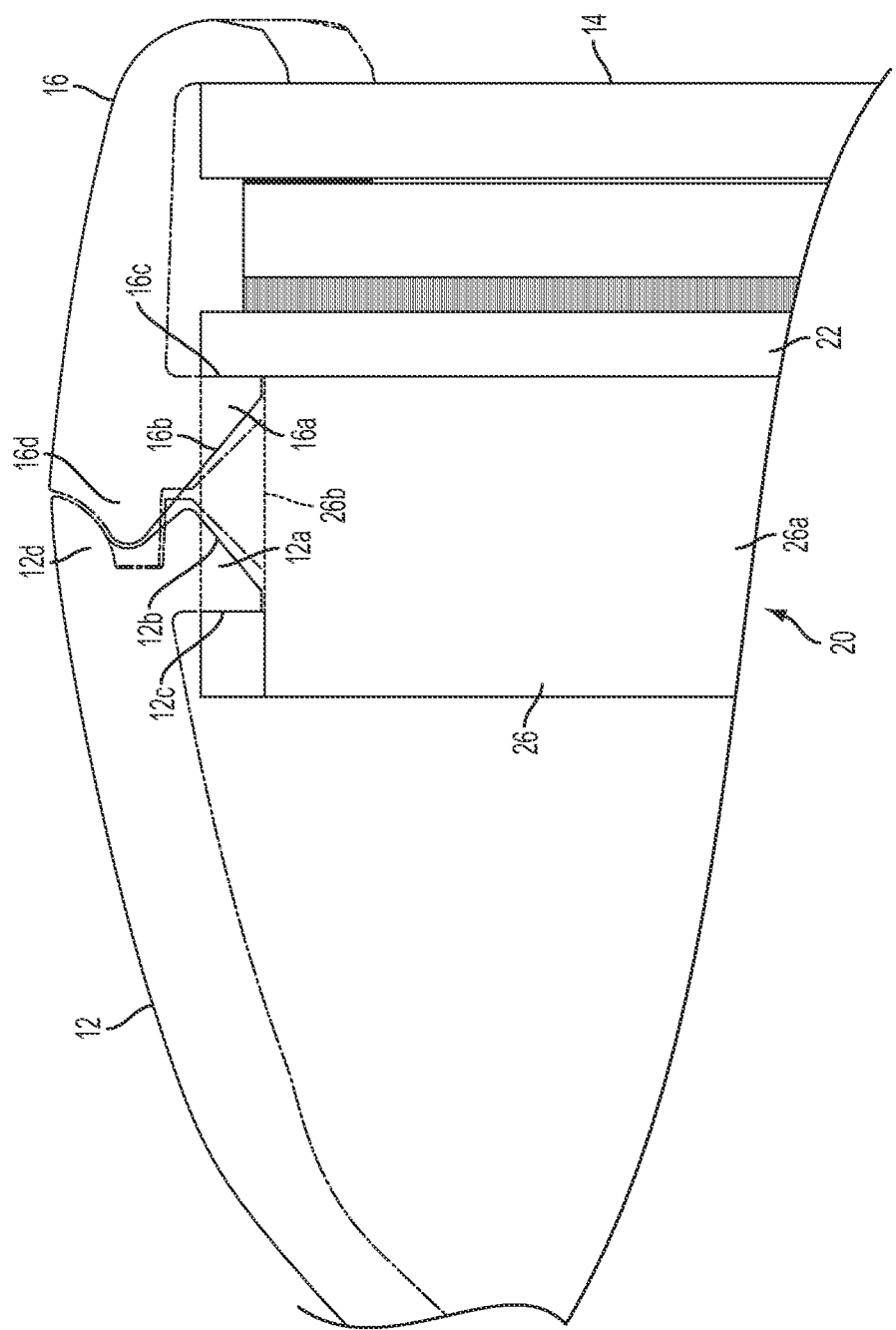
FIG. 15 is an enlarged side elevation and partial sectional view of a portion of the interior rearview mirror assembly of FIG. 14.

Thus, the mirror construction of the present invention provides a backplate that functions to attach to the front and rear casing portions to couple and retain the front casing portion relative to the rear casing portion. In the illustrated embodiment, and as shown in FIGS. 14 and 15, the front edge portion 12d of the rear casing portion 12 is formed to mate with the rear edge portion 16d of the front casing portion 16 when the front and rear casing portions are attached to or coupled to the backplate. In the illustrated embodiment, the front edge portion 12d of rear casing portion 12 partially receives a protrusion of the rear edge portion 16d of the front casing portion 16 therein to assist in aligning the front and rear casing portions and to limit or substantially preclude movement of the front casing portion relative to the rear casing portion when the front and rear casing portions are attached to the backplate. The present invention thus provides enhanced assembly or construction of the mirror assembly and facilitates snapping together of the front casing portion, the backplate and the rear casing portion to ease manufacturing of the rearview mirror assembly.

As discussed above, the generally planar attachment portion 22 (that is adhered or otherwise attached at the rear surface of the reflective element) and the pivot element 24 are integrally or unitarily formed, such as via injection molding of a plastic or polymeric or engineering plastic material or the like, to establish or mold the unitary backplate 20. In the illustrated embodiment, the pivot element 24 comprises a socket element that is formed to receive a ball member 18a therein to pivotally attach the backplate 20 to the mounting assembly 18. The socket element 24 comprises a plurality of flexible tabs 24a that flex to receive the ball member 18a therein during assembly of the mirror, and the mirror assembly may include a coil spring 25 or the like around the flexible tabs or arms 24a to retain them around the ball member 18a to limit or substantially preclude unintentional dislodgement of the ball member from the socket element.

The reflective element 14 and mirror casing 12 thus are adjustable relative to the mounting arm or pivot assembly 18 to adjust the driver's rearward field of view when the mirror assembly is normally mounted at or in the vehicle. In the illustrated embodiment, the pivot element 24 of the back plate 20 of the mirror assembly comprises a socket or pivot mount that receives the ball member 18a of a mounting arm of the pivot assembly or mounting structure 18, which comprises a single pivot or single ball mounting structure, but may otherwise comprise a double pivot or double ball mounting structure or the like (such as by utilizing aspects of the pivot mounting assemblies described in U.S. Pat. Nos. 6,318,870; 6,593,565; 6,690,268; 6,540,193; 4,936,533; 5,820,097; 5,100,095; 7,249,860; 6,877,709; 6,329,925; 7,289,037; 7,249,860; and/or 6,483,438, and/or U.S. patent application Ser. No. 11/226,628, filed Sep. 14, 2005 and published Mar. 23, 2006 as U.S. Pat. Pub. No. US-2006-0061008, and/or PCT Application No. PCT/US2010/028130, filed Mar. 22, 2010 and published on Sep. 30, 2010 as International Publication No. WO 2010/111173, which are hereby incorporated herein by reference in their entireties). Optionally, it is envisioned that the pivot element 24 may comprise a ball member that is integrally formed as part of the unitary backplate and that is received in a socket element of a mounting arm or assembly, while remaining within the spirit and scope of the present invention. Optionally, the mounting assembly may have a ball or socket element mounted to or attached to or established at the mirror attachment plate or backing plate (which may optionally include or incorporate circuitry thereat or thereon) that is attached at the rear surface of the mirror reflective element (optionally with a mirror casing disposed over or receiving the attachment plate or with a cap portion of a mirror assembly attaching to the backing plate or the like, such as by utilizing aspects of the mirror assemblies described in U.S. Pat. No. 7,289,037, which is hereby incorporated herein by reference in its entirety), or the mounting assembly may have a ball or socket element mounted to or attached to or established at a portion of the mirror casing (or to an attachment element disposed at or in the mirror casing), where the ball or socket or pivot joint element pivotally attaches to a mounting arm or mounting structure that attaches to an interior portion of the vehicle, such as an inner surface of the vehicle windshield or the like.

In the illustrated embodiment, the mounting base is configured to be attached to an interior portion of a vehicle, such as to a header portion of a vehicle or to an inner surface of a vehicle windshield (such as to a mounting button or attachment element adhered to the interior surface of the vehicle windshield). The mounting base may be mounted to a mounting button or attachment element at the vehicle header or vehicle windshield via a breakaway mounting construction, such as by utilizing aspects of the mounting constructions described in U.S. Pat. Nos. 5,820,097 and/or 5,100,095, which are hereby incorporated herein by reference in their entireties. The mounting arm may comprise a molded (such as injection molded) polymeric mounting arm or may be otherwise formed, depending on the particular application of the mirror assembly (and may utilize aspects of the mounting assemblies described in U.S. Pat. Nos. 6,318,870; 6,593,565; 6,690,268; 6,540,193; 4,936,533; 5,820,097; 5,100,095; 7,249,860; 6,877,709; 6,329,925; 7,289,037; 7,249,860; and/or 6,483,438, and/or U.S. patent application Ser. No. 11/226,628, filed Sep. 14, 2005 and published Mar. 23, 2006 as U.S. Pat. Pub. No. US-2006-0061008, and/or PCT Application No. PCT/US2010/028130, filed Mar. 22, 2010 and published on Sep. 30, 2010 as International Publication No. WO 2010/111173, which are hereby incorporated herein by reference in their entireties).

Optionally, and desirably, the backplate 20 may have circuitry disposed at the generally planar attachment portion 22, such as circuit element or substrate with electronic circuitry established thereat (such as a printed circuit board or the like) for providing electronic features or content to the interior rearview mirror assembly. An electrical wiring or lead may electrically connect the circuitry of the mirror assembly to a vehicle wiring harness or the like to provide power and/or control to the electronic circuitry and/or accessories housed in or disposed at the mirror assembly. Optionally, the electrical wiring or lead may pass through the mounting arm and ball member 18a of the mounting assembly and through an aperture 12e established in rear mirror casing portion 12 and into the pivot element 24 and through an aperture 24b established through the pivot element 24, where a connector end of the electrical wiring may electrically connect to a connector at the circuit element at the backplate 20 during construction of the mirror assembly. For example, the ball member may be received through the aperture 12e at the rear of the rear casing portion 12 and the connector end of the electrical wiring may be fed from the end of the ball member 18a into and through the socket element 24 and through the aperture 24b and connected to the connector at the circuitry at the backplate. The ball member 18a may then be snapped into the socket element 24 and the backplate may be snapped to the rear casing portion 12, such as described above. The mirror reflective element may be adhered or attached to the generally planar attachment portion 22 of the backplate and the bezel or front casing portion 16 may be snapped onto the backplate, also such as described above. The assembled mirror assembly may then be mounted to the interior portion of the vehicle via any suitable manner or means.

In the illustrated embodiment, the front casing portion or bezel 16 receives the reflective element therein when the bezel is attached or coupled to the mirror backplate (with the reflective element adhered or attached to the generally planar attachment portion or surface of the backplate), and the bezel includes a forward overlapping portion or lip that overlaps and encroaches on the perimeter region of the front surface of the reflective element. Optionally, aspects of the mirror assembly or mirror construction of the present invention may be suitable for use on bezelless type of mirrors, where a front casing portion may circumscribe a perimeter edge of the reflective element, but does not encroach on or overlap the front surface of the reflective element (such as described in U.S. Pat. Nos. 7,255,451 and 7,289,037, and/or PCT Application No. PCT/US2011/056295, filed Oct. 14, 2011 and published on Apr. 19, 2012 as International Publication No. WO 2012/051500, and/or U.S. provisional applications, Ser. No. 61/647,179, filed May 15, 2012; Ser. No. 61/614,877, filed Mar. 23, 2012; Ser. No. 61/601,756, filed Feb. 22, 2012; Ser. No. 61/590,578, filed Jan. 25, 2012; Ser. No. 61/565,541, filed Dec. 1, 2011; and/or Ser. No. 61/558,623, filed Nov. 11, 2011, which are hereby incorporated herein by reference in their entireties). Optionally, the front casing portion may only encompass a perimeter edge region of a rear substrate of an electro-optic (such as electrochromic) reflective element, with the forward edge portion of the front casing portion being disposed at a rear surface of the front substrate where the front substrate extends beyond the rear substrate, such as by utilizing aspects of the mirror assemblies described in PCT Application No. PCT/US2010/032017, filed Apr. 22, 2010 and published on Oct. 28, 2010 as International Publication No. WO 2010/124064, and/or PCT Application No. PCT/US10/51741, filed Oct. 7, 2010 and published on Apr. 14, 2011 as International Publication No. WO 2011/044312, and/or PCT Application No. PCT/US2011/056295, filed Oct. 14, 2011 and published on Apr. 19, 2012 as International Publication No. WO 2012/051500, and/or U.S. provisional applications, Ser. No. 61/647,179, filed May 15, 2012; Ser. No. 61/614, 877, filed Mar. 23, 2012; Ser. No. 61/601,756, filed Feb. 22, 2012; Ser. No. 61/590,578, filed Jan. 25, 2012; Ser. No. 61/565,541, filed Dec. 1, 2011; and/or Ser. No. 61/558,623, filed Nov. 11, 2011, which are hereby incorporated herein by reference in their entireties.

Optionally, the mirror assembly may include a lighting feature that is operable to backlight or illuminate a portion of the reflective element, such as to provide enhanced aesthetics to the interior rearview mirror assembly. For example, such a lighting features may illuminate or cause to glow a portion of the reflective element or bezel or front mirror casing (such as a perimeter portion or region of the reflective element or bezel portion) and may illuminate the portion or cause the portion to glow in a desired or selected color scheme (which may be coordinated or selected to match or contrast with the lighting scheme of the vehicle or that may be coordinated an adjustable color scheme or lighting scheme of the vehicle). Optionally, for example, the illumination feature may operate in conjunction with or corresponding to a selected custom color for the interior lighting of the vehicle (such as MYCOLOR® offered by Ford Motor Company), whereby the illumination color emitted by the illumination source or sources or lighting element of the interior rearview mirror assembly may be selected or customized by the user to a desired color or color combination. The colored illumination scheme may be selected to match the lighting scheme of the vehicle in which the mirror assembly is mounted or the owner of the vehicle may separately select a color scheme to customize or personalize the interior rearview mirror assembly (such as by utilizing aspects of the mirror assemblies described in U.S. Pat. Nos. 7,626,749; 7,255,451; 7,289,037, which are hereby incorporated herein by reference in their entireties).

Figure 16:
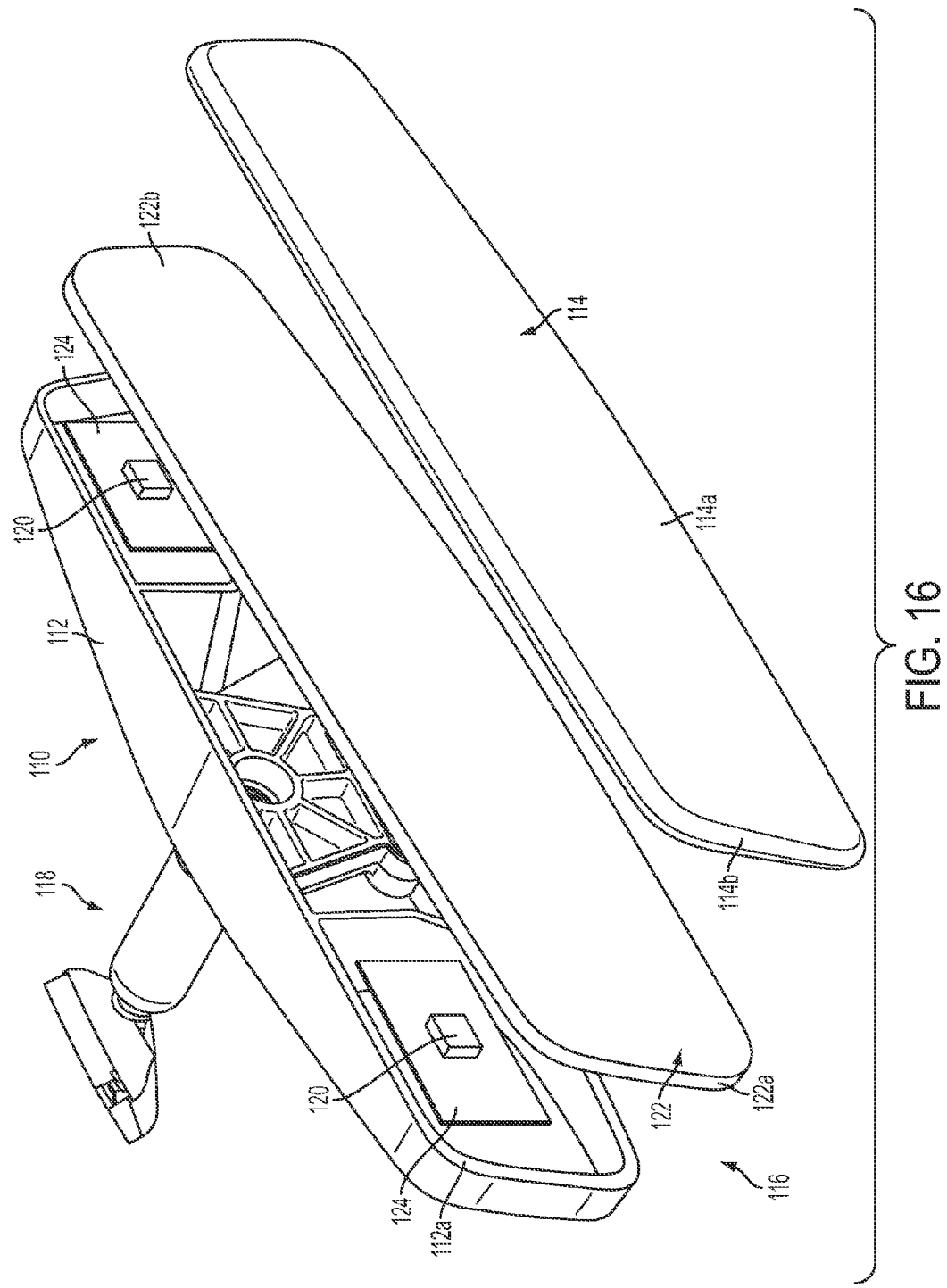
FIG. 16 is an exploded perspective view of another interior rearview mirror assembly, having a perimeter lighting feature in accordance with the present invention.

Optionally, and with reference to FIG. 16, an interior rearview mirror assembly 110 for a vehicle includes a mirror casing or housing or shroud or cap or holder 112, a reflective element 114 positioned at a front portion of the mirror casing 112 and a lighting system or device 116 operable to provide illumination at and behind and generally around the periphery of the reflective element 114. Mirror assembly 110 is adjustably mounted to an interior portion of a vehicle (such as to an interior surface of a vehicle windshield or a headliner of a vehicle or the like) via a mounting structure or mounting configuration or assembly 118.

In the illustrated embodiment, the lighting device or system 116 comprises one or more illumination sources 120 (such as two or more light emitting diodes (LEDs)) and a light directing element or light guiding element 122 (such as a plastic or polymeric light pipe or light directing element). The illumination sources 120 are disposed at or in the mirror casing 112, such as at a circuit element or circuit board or circuit boards 124 disposed at the casing 112. The light directing element 122 is disposed at the rear of the reflective element 114 and functions to receive light emitted by illumination sources 120 and direct the light to the perimeter region of the mirror reflective element 114. The light system 116 thus provides illumination at a perimeter region of the mirror assembly to provide circumferential or peripheral illumination at the reflective element and/or mirror casing for viewing by the driver of the vehicle. The illumination device or system is preferably operable to provide a low light level or intensity or "glow" at the periphery of the mirror assembly and in a desired or selected color to enhance the appearance of the mirror assembly.

In the illustrated embodiment, the mirror reflective element 114 comprises a prismatic reflective element that is mounted at the front edge region 112a of the mirror casing 112, with its outermost perimeter edge or corner 114b being exposed and rounded to provide a curved transition from the generally planar front surface 114a to the outer surface of the sides of the mirror casing 112, such as by utilizing aspects of the mirror assemblies described in U.S. Pat. Nos. 7,184,190; 7,255,541 and/or 7,289,037, and/or U.S. Des. Pat. No. D647,017; D638,761; D633,423 and/or D633,019, and/or PCT Application No. PCT/US2010/032017, filed Apr. 22, 2010 and published on Oct. 28, 2010 as International Publication No. WO 2010/124064, and/or PCT Application No. PCT/US10/51741, filed Oct. 7, 2010 and published on Apr. 14, 2011 as International Publication No. WO 2011/044312, and/or PCT Application No. PCT/US2011/056295, filed Oct. 14, 2011 and published on Apr. 19, 2012 as International Publication No. WO 2012/051500, and/or U.S. provisional applications, Ser. No. 61/647,179, filed May 15, 2012; Ser. No. 61/614,877, filed Mar. 23, 2012; Ser. No. 61/601,756, filed Feb. 22, 2012; Ser. No. 61/590,578, filed Jan. 25, 2012; Ser. No. 61/565,541, filed Dec. 1, 2011; and/or Ser. No. 61/558,623, filed Nov. 11, 2011, which are hereby incorporated herein by reference in their entireties. As shown in FIG. 16, light directing element 122 is at the rear of mirror reflective element 114 (and may be adhered at the rear surface of the mirror reflective element) and may be attached at or to mirror casing 112 such that the perimeter edge region 122a of light directing element 122 is exposed and viewable between the mirror casing 112 and the reflective element 114.

Thus, light emitted by the illumination sources 120 is directed by light directing element 122 towards and out from the perimeter edge region 122a of light directing element 122 to provide a circumferential light ring about and behind the reflective element 114 of the mirror assembly 110. The front surface 122b of light directing element 122 may be darkened or opaque or non-light transmitting so that light received by light directing element 122 from illumination sources 120 does not transmit through front surface 122b of light directing element so as to be not viewable through the mirror reflective element 114 when the driver or occupant of the vehicle is viewing the mirror assembly when normally mounted in the vehicle. Optionally, the light directing element or ring may be selectively operable or solely operable to only illuminate along the lower perimeter region, whereby the illumination provided by the light directing element may function as an interior accent/console light that would be less noticeable to the driver (so the driver would not directly view the light source, just the illumination below the mirror assembly, such as at the instrument panel or a center stack area or the like). Optionally, the light directing element may be operable to backlight an icon or graphic or logo at the reflective element (such as an icon or logo or graphic that is laser etched, soda-blasted or masked or otherwise established at the reflective surface of the reflective element).

Optionally, the light directing element may also or otherwise provide illumination or a light pattern that is viewable through the reflective element, such as at a perimeter region of the reflective element. For example, the front surface of the light directing element may be opaque or non-light transmitting at the central or non-peripheral portion of the light directing element, but may have a light transmitting peripheral band about its perimeter region so that light received by the light directing element from the illumination sources transmits through the perimeter region or band area of the front surface of the light directing element so as to be viewable through the mirror reflective element (with the perimeter region of the reflective element comprising a light transmissive region, such as by having a partially transmissive, partially reflective transflective mirror reflector or by having the reflective element devoid or substantially devoid of the mirror reflector at the perimeter region) when the driver or occupant of the vehicle is viewing the mirror assembly when normally mounted in the vehicle. In such an embodiment, the light directing element may also have illumination emanating from its perimeter edge and/or may be at least partially received at the mirror casing (and may attach thereto via an attaching flange such as described above) so as to be not visible or viewable between the reflective element and the mirror casing.

Optionally, the illumination around the perimeter of the reflective element may be provided via a light pipe or the like disposed around and along the periphery of and rearward of a reflective element, such that the light illuminated by the light pipe is viewable through the reflective element at the periphery of the reflective element. For example, and with reference to FIG. 17, an interior rearview mirror assembly 110' for a vehicle includes a mirror casing or housing or shroud or cap or holder 112', a reflective element 114' positioned at a front portion of the mirror casing 112' and a lighting system or device 116' operable to provide illumination at and behind and generally around and through the periphery of the reflective element 114'. Mirror assembly 110' is adjustably mounted to an interior portion of a vehicle (such as to an interior surface of a vehicle windshield or a headliner of a vehicle or the like) via a mounting structure or mounting configuration or assembly, such as described above.

In the illustrated embodiment, the lighting device or system 116' comprises one or more illumination sources 120' (such as two or more light emitting diodes (LEDs)) and a light directing element or light guiding element or light pipe 122' (such as a plastic or polymeric light pipe or light directing element that emits light or glows along the light pipe when the light emitting diode or diodes is/are energized or activated). The illumination sources 120' are disposed at or in the mirror casing 112', such as at a circuit element or circuit board or circuit boards 124' disposed at the casing 112'. The light directing element 122' is disposed at the rear of the reflective element 114' and generally around and along the periphery of the reflective element and has light receiving ends 122a' that function to receive light emitted by illumination sources 120' (such as via respective couplers 123' that attach or connect or retain the ends 122a' of the light pipe 122' at or near the light sources 120' at the respective circuit elements or boards 124'), whereby the received light is directed along the light pipe and along the perimeter region of the mirror reflective element 114'. The lighting system 116' thus provides illumination at a perimeter region of the mirror reflective element to provide circumferential or peripheral illumination at the reflective element and/or mirror casing for viewing by the driver of the vehicle. The illumination device or system is preferably operable to provide a low light level or intensity or "glow" at the periphery of the mirror assembly and in a desired or selected color to enhance the appearance of the mirror assembly.

In the illustrated embodiment, the mirror reflective element 114' comprises a prismatic reflective element that is mounted at an attachment plate 126', which may be received in and snapped or attached at the front edge region 112a' of the mirror casing 112', such that the mirror reflective element 114' is disposed at the front edge region 112a' of the mirror casing 112' and has its outermost perimeter edge or corner 114b' exposed and rounded to provide a curved transition from the generally planar front surface 114a' to the outer surface of the sides of the mirror casing 112', such as by utilizing aspects of the mirror assemblies described in U.S. Pat. Nos. 7,184,190; 7,255,541 and/or 7,289,037, and/or U.S. Des. Pat. Nos. D647,017; D638,761; D633,423 and/or D633,019, and/or PCT Application No. PCT/US2010/032017, filed Apr. 22, 2010 and published on Oct. 28, 2010 as International Publication No. WO 2010/124064, and/or PCT Application No. PCT/US10/51741, filed Oct. 7, 2010 and published on Apr. 14, 2011 as International Publication No. WO 2011/044312, and/or PCT Application No. PCT/US2011/056295, filed Oct. 14, 2011 and published on Apr. 19, 2012 as International Publication No. WO 2012/051500, and/or U.S. provisional applications, Ser. No. 61/647,179, filed May 15, 2012; Ser. No. 61/614,877, filed Mar. 23, 2012; Ser. No. 61/601,756, filed Feb. 22, 2012; Ser. No. 61/590,578, filed Jan. 25, 2012; Ser. No. 61/565,541, filed Dec. 1, 2011; and/or Ser. No. 61/558,623, filed Nov. 11, 2011, which are all hereby incorporated herein by reference in their entireties.

Figure 17:
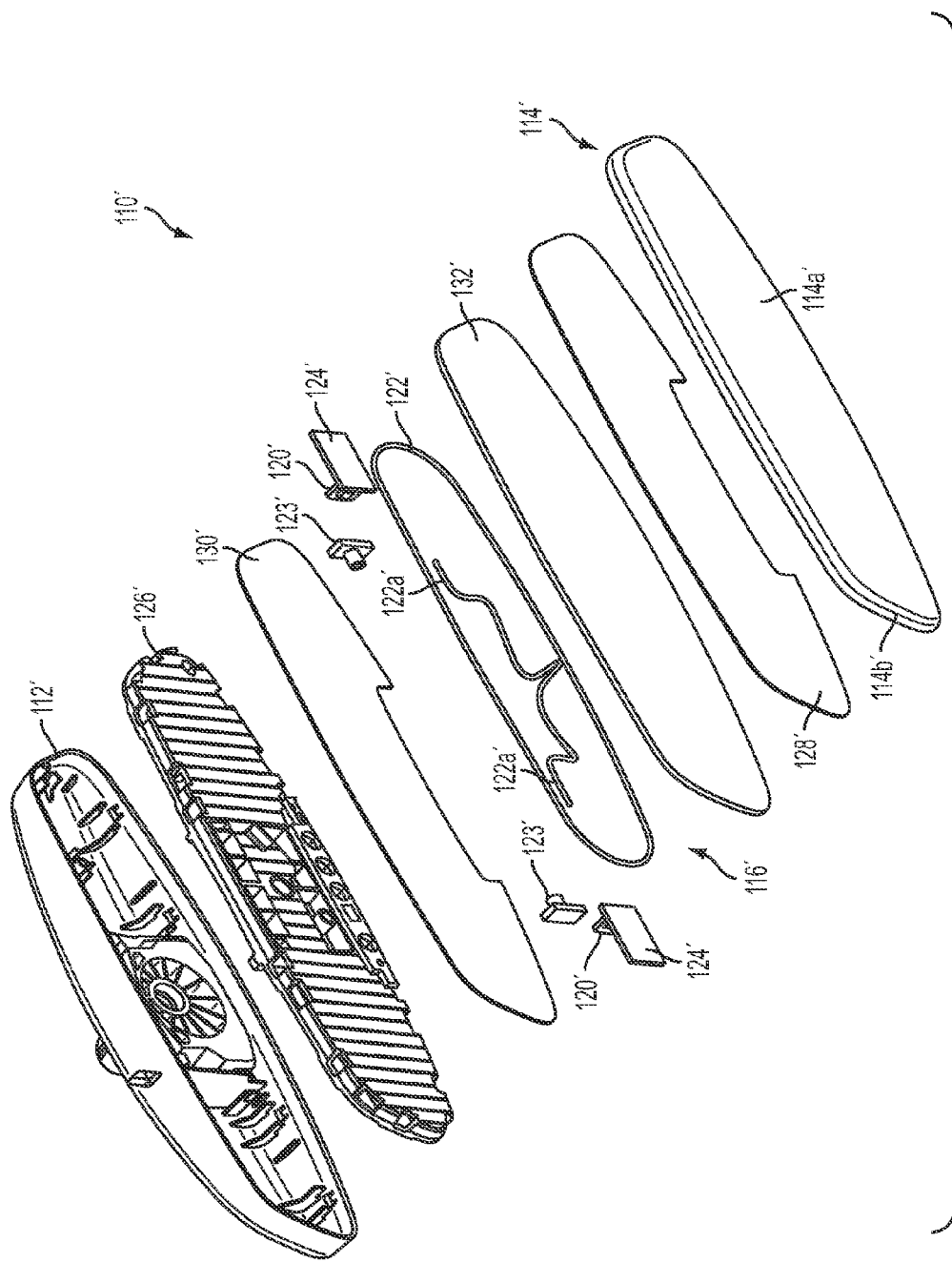
FIG. 17 is an exploded perspective view of another interior rearview mirror assembly, having another perimeter lighting feature in accordance with the present invention.

As shown in FIG. 17, light directing element 122' is disposed at the rear of mirror reflective element 114' and may be adhered at the rear surface of the mirror reflective element via an adhesive or tape 128', and may also be adhered or attached at the attachment plate 126' via an adhesive or tape 130'. The attachment plate 126' may be attached at or to mirror casing 112' such that the light pipe 122' is nested in or at least partially received in the mirror casing 112', and thus may not be exposed and readily directly viewable between the mirror casing 112' and the reflective element 114'. Thus, light emitted by the illumination sources 120' is directed or guided along light directing element 122' and is viewable through the reflective element 114' and thus the lighting system 116' provides a circumferential light ring about and behind the reflective element 114' of the mirror assembly 110'. Optionally, a diffuser element 132' may be disposed over the light pipe 122' and between the light pipe 122' and the reflective element 114' to diffuse the light emitted by and along the light pipe 122' so that the light pipe 122' provides a glow or ring of softened or diffused illumination around the periphery of the mirror reflective element 114'. The light pipe may provide any desired or selected color of illumination, such as white or other selected color that may be selected by the user of the vehicle (and may be selected to match an interior color lighting scheme of the vehicle).

Thus, the illumination device or system of the present invention provides perimeter lighting or illumination at the perimeter region of the reflective element and/or mirror casing. The illumination device or system may be operable to provide such illumination in response to a user actuatable input (such as a button or switch or touch sensor disposed at or in the mirror assembly) or the illumination device or system may be activated responsive to a light sensor (whereby the illumination sources may be activated or energized responsive to the ambient light level being determined to be at or below a threshold level) or the illumination device may be activated for a period of time after a triggering event or signal or input (such as actuation of a door lock/unlock button of a key fob or the like or actuation of a passive entry system or opening/closing of the vehicle door or an initial ignition on detection or the like), such that the mirror illumination device is actuated with one or more interior and/or exterior lights of the vehicle for a brief duration following such a triggering event or signal or input.

Figure 18:
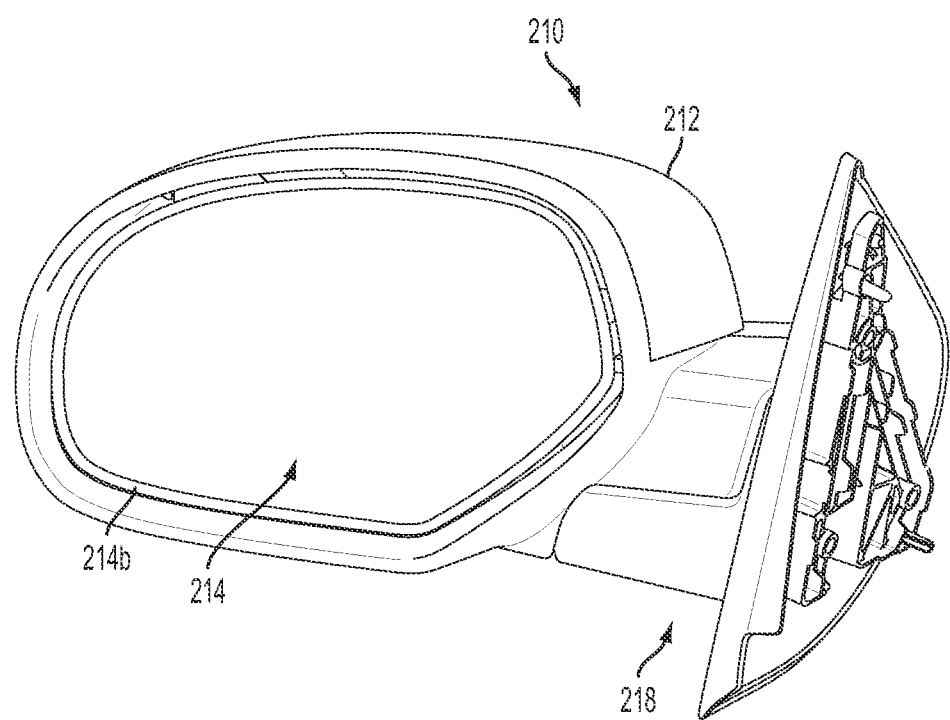
FIG. 18 is a perspective view of an exterior rearview mirror assembly having a perimeter lighting feature in accordance with the present invention.

Optionally, an illumination device or system such as described above may also or otherwise be implemented at one or both exterior rearview mirror assemblies of the vehicle. For example, and as shown in FIGS. 18 and 19, an exterior rearview mirror assembly 210 for a vehicle includes a mirror casing or housing 212, a reflective element 214 positioned at a rear portion of the mirror casing 212 and a lighting system or device 216 operable to provide illumination at and behind and generally around the periphery of the reflective element 214. Mirror assembly 210 is mounted at an exterior portion of a vehicle (such as to an exterior surface of a vehicle door or the like) via a mirror base or mounting structure 218. As shown in FIG. 19, lighting system or device 216 comprises an illumination source 220 and a light guiding element or light directing element or light pipe 222, which is configured to receive illumination emitted by illumination source 220 (such as a light emitting diode or the like disposed at a circuit element or circuit board 223 disposed at a back plate 224 of the mirror assembly 210) and to direct the illumination about the light pipe, with a rearward facing portion of the light pipe being light transmitting to project or emit illumination rearward towards the reflective element 214. The light pipe 222 is configured to circumscribe the back plate and may be retained at or attached to the back plate 224 via any suitable means, such as via adhesive or snaps or clips or the like, such that the light pipe and back plate construction is attachable to or at the rear surface of the reflective element, such as via a suitable adhesive or the like.

The reflective element 214 comprises a mirror reflector 214a established at its rear surface (and at least at a central or principal reflecting region of the reflective element) and has a perimeter area or band region 214b at its perimeter for allowing illumination emanating from the light pipe 222 to pass therethrough for viewing by a person viewing the exterior rearview mirror assembly when it is normally mounted at a side of a vehicle. The perimeter band region 214b may be substantially devoid of the mirror reflector or any opaque or substantially opaque coating, so that the light emanating from the light pipe 222 is substantially directly viewable through the reflective element. Optionally, the perimeter band region 214b may be colored and/or partially light transmitting so that the light emanating from the light pipe is colored or tinted as viewed by the person viewing the exterior mirror assembly.

Thus, the exterior rearview mirror assembly provides at least one light source that illuminates the mirror shape at the outer edge region of the mirror reflective element. The light as viewed by the person viewing the mirror assembly may be white light or any desired color, such as discussed above. Optionally, the mirror assembly may use a combination of colored light sources (such as RGB light sources or the like) to provide a number of different colors that may be selected by the user or set to a color scheme of the vehicle, such as discussed above. For example, the illumination source or LED or LEDs may comprise an LED with different colored dies (such as three colored chips or dies, such as RGB colored dies or the like), whereby the color of light emitted by the LED or LEDs can be controlled using pulse width modulation.

In the illustrated embodiment, the mirror reflector of the mirror reflective element at the outer or perimeter edge region is etched or masked (or otherwise processed or ablated) to provide a generally clear or non-reflective or non-opaque perimeter region. The light pipe is disposed behind the glass surface so that the light is seen through the glass substrate of the reflective element at the perimeter region of the reflective element. Optionally, other means for providing perimeter lighting at the mirror assembly may be implemented while remaining within the spirit and scope of the present invention. For example, a transreflective mirror reflector (DOD) may be used as the mirror reflector so that the light emanating from the light pipe passed through or is transmitted through the transreflective mirror reflector at the perimeter region so the light can be seen through the glass substrate when the light source is activated but the light pipe is not viewable or discernible through the mirror reflector when the light source is deactivated. Optionally, for example, and while remaining within the spirit and scope of the present invention, the light pipe may be integrated into an outer edge of a bezel portion or lip of the mirror casing (that circumscribes the outer perimeter of the reflective element), or the light source may be disposed in the mirror casing and the light emanating therefrom may fill the inside of the mirror casing so as to be seen around the gap between the perimeter edge of the reflective element and the perimeter portion or lip of the mirror casing (and the mirror casing may include an inner reflective surface or light guiding/directing surface to direct the illumination towards the gap), or the light pipe may be set back in the mirror casing so that it can be seen at and around the gap between the perimeter edge of the reflective element and the perimeter portion or lip of the mirror casing, or the light pipe may be integrated into the mirror casing bezel (and rearward opening of mirror casing), or part or all of the mirror casing bezel may be translucent or at least partially light transmitting to allow light emanating from the light pipe to pass through the translucent or partially light transmitting bezel or casing portion so as to be viewable by the driver of the vehicle viewing the exterior rearview mirror assembly when the exterior rearview mirror assembly is normally mounted at the vehicle.

Optionally, the reflective element of any of the interior or exterior rearview mirror assemblies described herein may comprise an electro-optic (such as electrochromic) reflective element (but may comprise a prismatic or wedge-shaped reflective element), and may include a front substrate having a front or first surface (the surface that generally faces the driver of a vehicle when the mirror assembly is normally mounted in the vehicle) and a rear or second surface opposite the front surface, and a rear substrate having a front or third surface and a rear or fourth surface opposite the front surface, with an electro-optic medium disposed between the second surface and the third surface and bounded by a perimeter seal of the reflective element (such as is known in the electrochromic mirror art). The second surface has a transparent conductive coating established thereat, while the third surface has a metallic reflector coating established thereat. The transparent conductive coating and/or the mirror reflector may comprise any suitable coatings or layers, and the mirror reflector may comprise a transflective coating or layer, such as described in U.S. Pat. Nos. 7,626,749; 7,274,501; 7,255,451; 7,195,381; 7,184,190; 6,690,268; 5,140,455; 5,151,816; 6,178,034; 6,154,306; 6,002,544; 5,567,360; 5,525,264; 5,610,756; 5,406,414; 5,253,109; 5,076,673; 5,073,012; 5,117,346; 5,724,187; 5,668,663; 5,910,854; 5,142,407 and/or 4,712,879, which are hereby incorporated herein by reference in their entireties, disposed at the front surface of the rear substrate (commonly referred to as the third surface of the reflective element) and opposing the electro-optic medium, such as an electrochromic medium disposed between the front and rear substrates and bounded by the perimeter seal (but optionally, the mirror reflector could be disposed at the rear surface of the rear substrate (commonly referred to as the fourth surface of the reflective element), while remaining within the spirit and scope of the present invention).

The mirror assembly thus may comprise an electro-optic or electrochromic mirror assembly and may include an electro-optic or electrochromic reflective element. The perimeter edges of the reflective element may be encased or encompassed by the perimeter element or portion of the bezel portion to conceal and contain and envelop the perimeter edges of the substrates and the perimeter seal disposed therebetween. The electrochromic mirror element of the electrochromic mirror assembly may utilize the principles disclosed in commonly assigned U.S. Pat. Nos. 7,274,501; 7,255,451; 7,195,381; 7,184,190; 6,690,268; 5,140,455; 5,151,816; 6,178,034; 6,154,306; 6,002,544; 5,567,360; 5,525,264; 5,610,756; 5,406,414; 5,253,109; 5,076,673; 5,073,012; 5,117,346; 5,724,187; 5,668,663; 5,910,854; 5,142,407 and/or 4,712,879, and/or PCT Application No. PCT/US2010/029173, filed Mar. 30, 2010 and published on Oct. 7, 2010 as International Publication No. WO 2010/114825, which are hereby incorporated herein by reference in their entireties, and/or as disclosed in the following publications: N. R. Lynam, "Electrochromic Automotive Day/Night Mirrors", SAE Technical Paper Series 870636 (1987); N. R. Lynam, "Smart Windows for Automobiles", SAE Technical Paper Series 900419 (1990); N. R. Lynam and A. Agrawal, "Automotive Applications of Chromogenic Materials", Large Area Chromogenics: Materials and Devices for Transmittance Control, C. M. Lampert and C. G. Granquist, EDS., Optical Engineering Press, Wash. (1990), which are hereby incorporated by reference herein in their entireties; and/or as described in U.S. Pat. No. 7,195,381, which is hereby incorporated herein by reference in its entirety. Optionally, the electrochromic circuitry and/or a glare sensor (such as a rearward facing glare sensor that receives light from rearward of the mirror assembly and vehicle through a port or opening along the casing and/or reflective element of the mirror assembly) and circuitry and/or an ambient light sensor and circuitry may be provided on one or more circuit boards of the mirror assembly. The mirror assembly may include one or more other displays, such as the types disclosed in U.S. Pat. Nos. 5,530,240 and/or 6,329,925, which are hereby incorporated herein by reference in their entireties, and/or display-on-demand transflective type displays, such as the types disclosed in U.S. Pat. Nos. 7,274,501; 7,255,451; 7,195,381; 7,184,190; 5,668,663; 5,724,187 and/or 6,690,268, and/or in U.S. patent application Ser. No. 11/226,628, filed Sep. 14, 2005 and published Mar. 23, 2006 as U.S. Pat. Pub. No. US-2006-0061008; and/or Ser. No. 10/538,724, filed Jun. 13, 2005 and published Mar. 9, 2006 as U.S. Pat. Pub. No. US-2006-0050018, which are all hereby incorporated herein by reference in their entireties. The thicknesses and materials of the coatings on the substrates, such as on the third surface of the reflective element assembly, may be selected to provide a desired color or tint to the mirror reflective element, such as a blue colored reflector, such as is known in the art and such as described in U.S. Pat. Nos. 5,910,854; 6,420,036; and/or 7,274,501, which are all hereby incorporated herein by reference in their entireties.

Optionally, it is envisioned that aspects of the present invention may be suitable for an interior rearview mirror assembly that comprises a prismatic mirror assembly or a non-electro-optic mirror assembly (such as a generally planar or optionally slightly curved mirror substrate) or an electro-optic or electrochromic mirror assembly. For example, the interior rearview mirror assembly may comprise a prismatic mirror assembly, such as the types described in U.S. Pat. Nos. 7,289,037; 7,249,860; 6,318,870; 6,598,980; 5,327,288; 4,948,242; 4,826,289; 4,436,371; and 4,435,042, which are hereby incorporated herein by reference in their entireties. Optionally, the prismatic reflective element may comprise a conventional prismatic reflective element or prism or may comprise a prismatic reflective element of the types described in U.S. Pat. Nos. 7,420,756; 7,289,037; 7,274,501; 7,249,860; 7,338,177; and/or 7,255,451, which are all hereby incorporated herein by reference in their entireties, without affecting the scope of the present invention. A variety of mirror accessories and constructions are known in the art, such as those disclosed in U.S. Pat. Nos. 5,555,136; 5,582,383; 5,680,263; 5,984,482; 6,227,675; 6,229,319; and 6,315,421 (which are hereby incorporated herein by reference in their entireties), that can benefit from the present invention.

Optionally, the reflective element may includes an opaque or substantially opaque or hiding perimeter layer or coating or band disposed around a perimeter edge region of the front substrate (such as at a perimeter region of the rear or second surface of the front substrate) to conceal or hide or the perimeter seal from viewing by the driver of the vehicle when the mirror assembly is normally mounted in the vehicle. Such a hiding layer or perimeter band may be reflective or not reflective and may utilize aspects of the perimeter bands and mirror assemblies described in U.S. Pat. Nos. 5,066,112; 7,626,749; 7,274,501; 7,184,190; and/or 7,255,451, and/or PCT Application No. PCT/US2010/032017, filed Apr. 22, 2010 and published on Oct. 28, 2010 as International Publication No. WO 2010/124064, and/or PCT Application No. PCT/US10/51741, filed Oct. 7, 2010 and published on Apr. 14, 2011 as International Publication No. WO 2011/044312, and/or U.S. patent application Ser. No. 11/226,628, filed Sep. 14, 2005 and published Mar. 23, 2006 as U.S. Pat. Pub. No. US-2006-0061008, which are all hereby incorporated herein by reference in their entireties. Optionally, the perimeter band may comprise a chrome/chromium coating or metallic coating and/or may comprise a chrome/chromium or metallic coating that has a reduced reflectance, such as by using an oxidized chrome coating or chromium oxide coating or "black chrome" coating or the like (such as by utilizing aspects of the mirror assemblies described in U.S. Pat. Nos. 7,184,190 and/or 7,255,451, which are hereby incorporated herein by reference in their entireties). Optionally, other opaque or substantially opaque coatings or bands may be implemented while remaining within the spirit and scope of the present invention.

Optionally, the mirror assembly may comprise a frameless or bezelless mirror assembly such as described in U.S. Pat. Nos. 7,184,190; 7,255,541 and/or 7,289,037, and/or U.S. Des. Pat. No. D647,017; D638,761; D633,423 and/or D633,019, and/or PCT Application No. PCT/US2010/032017, filed Apr. 22, 2010 and published on Oct. 28, 2010 as International Publication No. WO 2010/124064, and/or PCT Application No. PCT/US10/51741, filed Oct. 7, 2010 and published on Apr. 14, 2011 as International Publication No. WO 2011/044312, and/or PCT Application No. PCT/US2011/056295, filed Oct. 14, 2011 and published on Apr. 19, 2012 as International Publication No. WO 2012/051500, which are hereby incorporated herein by reference in their entireties.

The rearview mirror assembly may include a casing, such as described above, or the mirror assembly may comprise or utilize aspects of other types of casings or the like, such as described in U.S. Pat. Nos. 7,338,177; 7,289,037; 7,249,860; 6,439,755; 4,826,289; and 6,501,387, which are all hereby incorporated herein by reference in their entireties, without affecting the scope of the present invention. For example, the mirror assembly may utilize aspects of the flush or frameless or bezelless reflective elements described in U.S. Pat. Nos. 7,626,749; 7,360,932; 7,289,037; 7,255,451; 7,274,501; and/or 7,184,190, and/or in U.S. patent application Ser. No. 11/226,628, filed Sep. 14, 2005 and published Mar. 23, 2006 as U.S. Pat. Pub. No. US-2006-0061008; and/or Ser. No. 10/538,724, filed Jun. 13, 2005 and published Mar. 9, 2006 as U.S. Pat. Pub. No. US-2006-0050018, which are all hereby incorporated herein by reference in their entireties.

Optionally, the mirror assembly may comprise a modular mirror construction, and may include back housing portions or the like, such as cap portions of the types described in U.S. Pat. No. 7,289,037, which is hereby incorporated herein by reference in its entirety. A display screen may be provided as a modular display screen and may be mountable or installable in the appropriate or suitable mirror casing to provide a modular mirror assembly and display screen. For example, a rear casing or cap portion may include the display screen module including the associated components, such as the rails and motor and the like for a video slideout module (such as by utilizing aspects of the video mirrors described in U.S. Pat. Nos. 7,370,983 and 6,690,268, and/or U.S. patent application Ser. No. 10/538,724, filed Jun. 13, 2005 and published Mar. 9, 2006 as U.S. Pat. Pub. No. US-2006-0050018; and/or Ser. No. 12/091,525, filed Apr. 25, 2008 and published Jan. 15, 2009 as U.S. Pat. Pub. No. US-2009-0015736, which are hereby incorporated herein by reference in their entireties), and may be attachable to a reflective element and/or mirror casing to assemble the modular mirror assembly. The display screen module thus may be provided as an optional component or accessory for a vehicle, and may be readily assembled to a common reflective element and/or mirror casing of the mirror assembly.

Optionally, the mirror casing and/or reflective element may include customized or personalized viewable characteristics, such as color or symbols or indicia selected by the vehicle manufacturer or owner of the vehicle, such as the customization characteristics described in U.S. Pat. Nos. 7,626,749; 7,255,451; 7,289,037, which are hereby incorporated herein by reference in their entireties.

Optionally, the mirror assembly may include a video display screen or device. Optionally, the video display device may be operable to display the compass heading or directional heading character or characters (such as N, S, E, W, NE, SE, SW, NW or the like) at a portion or region of the video display screen and display region, such as by utilizing aspects of the mirror assemblies described in PCT Application No. PCT/US2011/056295, filed Oct. 14, 2011 and published on Apr. 19, 2012 as International Publication No. WO 2012/051500, and/or U.S. provisional applications, Ser. No. 61/647,179, filed May 15, 2012; Ser. No. 61/614,877, filed Mar. 23, 2012; Ser. No. 61/601,756, filed Feb. 22, 2012; Ser. No. 61/590,578, filed Jan. 25, 2012; Ser. No. 61/565,541, filed Dec. 1, 2011; and/or Ser. No. 61/558,623, filed Nov. 11, 2011, which are hereby incorporated herein by reference in their entireties. The video display device and compass display system may display the compass directional heading responsive to the vehicle being driven in a forward direction of travel (and the compass display may be deactivated or otherwise operate to not display the compass icons or characters when the vehicle is stationary or being driven in reverse, such as responsive to the vehicle gear actuator being moved to a non-drive gear position, such as park or reverse or the like) or responsive to a user input or responsive to a change in the direction of travel of the vehicle or the like. The video display device may be operable to display images captured by a rearward facing camera of the vehicle during a reversing maneuver of the vehicle (such as responsive to the vehicle gear actuator being placed in a reverse gear position or the like) to assist the driver in backing up the vehicle, and may be operable to display the compass heading or directional heading character or icon when the vehicle is not undertaking a reversing maneuver, such as when the vehicle is being driven in a forward direction along a road. The video display device and compass display system may comprise any suitable devices and systems and optionally may utilize aspects of the compass display systems described in U.S. Pat. Nos. 7,370,983; 7,329,013; 7,308,341; 7,289,037; 7,249,860; 7,004,593; 4,546,551; 5,699,044; 4,953,305; 5,576,687; 5,632,092; 5,677,851; 5,708,410; 5,737,226; 5,802,727; 5,878,370; 6,087,953; 6,173,508; 6,222,460; 6,513,252; and/or 6,642,851; and/or European patent application, published Oct. 11, 2000 under Publication No. EP 0 1043566, and/or U.S. patent application Ser. No. 11/226,628, filed Sep. 14, 2005 and published Mar. 23, 2006 as U.S. Publication No. 2006/0061008, which are all hereby incorporated herein by reference in their entireties. The compass system may comprise a compass sensor with one or more magnetoresponsive sensing elements and/or may include or utilize a global positioning system of the vehicle or the like to provide the directional heading information or to augment directional heading information determined by a magnetoresponsive compass sensor of the vehicle, such as by utilizing aspects of the compass display systems described in U.S. Pat. No. 7,308,341, which is hereby incorporated herein by reference in its entirety.

Optionally, a mirror assembly of the present invention may incorporate one or more touch or proximity sensitive user inputs and associated icons or the like so a user can readily identify the purpose or function of the user inputs and actuate the appropriate or desired or selected user input. Optionally, the front substrate of the reflective element may include aspects of the mirror assemblies described in U.S. Pat. Nos. 5,066,112; 7,626,749; 7,360,932; 7,274,501; 7,184,190; and/or 7,255,451, and/or PCT Application No. PCT/US2010/032017, filed Apr. 22, 2010 and published on Oct. 28, 2010 as International Publication No. WO 2010/124064, and/or PCT Application No. PCT/US10/51741, filed Oct. 7, 2010 and published on Apr. 14, 2011 as International Publication No. WO 2011/044312, and/or U.S. patent application Ser. No. 12/414,190, filed Mar. 30, 2009, now U.S. Pat. No. 8,154,418, and/or Ser. No. 11/226,628, filed Sep. 14, 2005 and published Mar. 23, 2006 as U.S. Pat. Pub. No. US-2006-0061008, and/or PCT Application No. PCT/US2011/056295, filed Oct. 14, 2011 and published on Apr. 19, 2012 as International Publication No. WO 2012/051500, and/or U.S. provisional applications, Ser. No. 61/647,179, filed May 15, 2012; Ser. No. 61/614,877, filed Mar. 23, 2012; Ser. No. 61/601,756, filed Feb. 22, 2012; Ser. No. 61/590,578, filed Jan. 25, 2012; Ser. No. 61/565,541, filed Dec. 1, 2011; and/or Ser. No. 61/558,623, filed Nov. 11, 2011, which are all hereby incorporated herein by reference in their entireties. Optionally, touch or proximity sensors may be disposed behind the reflective element and behind icons or indicia that are indicative of the function of the electronic switch associated with each sensor (in other words, there are no separate "buttons" established at the sensors and at or near or below the icons or indicia that indicate the function of the buttons or touch pads). Optionally, the mirror assembly may comprise a bezelless or frameless prismatic mirror assembly, such as a mirror assembly utilizing aspects of the mirror assemblies disclosed in U.S. Des. Pat. Nos. D647,017; D638,761; D633,423 and/or D633,019, and/or PCT Application No. PCT/US2010/032017, filed Apr. 22, 2010 and published on Oct. 28, 2010 as International Publication No. WO 2010/124064, and/or PCT Application No. PCT/US10/51741, filed Oct. 7, 2010 and published on Apr. 14, 2011 as International Publication No. WO 2011/044312, which are hereby incorporated herein by reference in their entireties).

Optionally, the mirror assembly may include or incorporate a compass sensor and circuitry for a compass system that detects and displays the vehicle directional heading to a driver of the vehicle may comprise any suitable compass sensor and/or circuitry. Optionally, the compass system and compass circuitry may utilize aspects of the compass systems described in U.S. Pat. Nos. 7,370,983; 7,329,013; 7,289,037; 7,249,860; 7,004,593; 6,928,366; 6,642,851; 6,140,933; 4,546,551; 5,699,044; 4,953,305; 5,576,687; 5,632,092; 5,677,851; 5,708,410; 5,737,226; 5,802,727; 5,878,370; 6,087,953; 6,173,508; 6,222,460; and/or 6,513,252, and/or European patent application, published Oct. 11, 2000 under Publication No. EP 0 1043566, and/or U.S. patent application Ser. No. 11/226,628, filed Sep. 14, 2005 and published Mar. 23, 2006 as U.S. Pat. Pub. No. US-2006-0061008, which are all hereby incorporated herein by reference in their entireties. The compass circuitry may include compass sensors, such as a magneto-responsive sensor, such as a magneto-resistive sensor, a magneto-capacitive sensor, a Hall sensor, a magneto-inductive sensor, a flux-gate sensor or the like. The sensor or sensors may be positioned at and within a base portion or mounting base of the mirror assembly so that the sensor/sensors is/are substantially fixedly positioned within the vehicle, or may be attached or positioned within the mirror casing. Note that the magneto-responsive sensor used with the mirror assembly may comprise a magneto-responsive sensor, such as a magneto-resistive sensor, such as the types disclosed in U.S. Pat. Nos. 5,255,442; 5,632,092; 5,802,727; 6,173,501; 6,427,349; and/or 6,513,252 (which are hereby incorporated herein by reference in their entireties), or a magneto-inductive sensor, such as described in U.S. Pat. No. 5,878,370 (which is hereby incorporated herein by reference in its entirety), or a magneto-impedance sensor, such as the types described in PCT Publication No. WO 2004/076971, published Sep. 10, 2004 (which is hereby incorporated herein by reference in its entirety), or a Hall-effect sensor, such as the types described in U.S. Pat. Nos. 6,278,271; 5,942,895 and/or 6,184,679 (which are hereby incorporated herein by reference in their entireties). The sensor circuitry and/or the circuitry in the mirror housing and associated with the sensor may include processing circuitry. For example, a printed circuit board may include processing circuitry which may include compensation methods, such as those described in U.S. Pat. Nos. 4,546,551; 5,699,044; 4,953,305; 5,576,687; 5,632,092; 5,677,851; 5,708,410; 5,737,226; 5,802,727; 5,878,370; 6,087,953; 6,173,508; 6,222,460; and/or 6,642,851, which are all hereby incorporated herein by reference in their entireties. The compass sensor may be incorporated in or associated with a compass system and/or display system for displaying a directional heading of the vehicle to the driver, such as a compass system of the types described in U.S. Pat. Nos. 7,289,037; 5,924,212; 4,862,594; 4,937,945; 5,131,154; 5,255,442; 5,632,092; and/or 7,004,593, which are all hereby incorporated herein by reference in their entireties.

Optionally, the mirror assembly may include user interface inputs, such as buttons or switches or touch or proximity sensors or the like, with which a user may adjust or control one or more accessories, such as via the principles described in U.S. Pat. No. 7,360,932 and/or U.S. patent application Ser. No. 12/091,525, filed Apr. 25, 2008 and published Jan. 15, 2009 as U.S. Pat. Pub. No. US-2009-0015736; Ser. No. 11/239,980, filed Sep. 30, 2005 and published Jun. 15, 2006 as U.S. Pat. Pub. No. US-2006-0125919; Ser. No. 12/414,190, filed Mar. 30, 2009, now U.S. Pat. No. 8,154,418; and/or Ser. No. 12/576,550, filed Oct. 9, 2009 and published Apr. 15, 2010 as U.S. Pat. Pub. No. US-2010-0091394, which are hereby incorporated herein by reference in their entireties.

A video display screen device or module of the mirror assembly or display system of the present invention may comprise any suitable type of video screen and is operable to display images in response to an input or signal from a control or imaging system. For example, the video display screen may comprise a multi-pixel liquid crystal module (LCM) or liquid crystal video display (LCD), preferably a thin film transistor (TFT) multi-pixel liquid crystal video display (such as discussed below), or the video screen may comprise a multi-pixel organic electroluminescent video display or a multi-pixel light emitting diode (LED) video display, such as an organic light emitting diode (OLED) or inorganic light emitting video diode display or the like, or an electroluminescent (EL) video display or the like. For example, the video display screen may comprise a video screen of the types disclosed in U.S. Pat. Nos. 7,855,755; 7,734,392; 7,370,983; 7,338,177; 7,274,501; 7,255,451;7, 195,381; 7,184,190; 6,902,284; 6,690,268; 6,428,172; 6,420,975; 5,668,663; 5,724,187;5,416,313; 5,285,060; 5,193,029 and/or 4,793,690, and/or U.S. patent application Ser. No. 13/023,750, filed Feb. 9, 2011, now U.S. Pat. No. 8,890,955; Ser. No. 10/538,724, filed Jun. 13, 2005 and published Mar. 9, 2006 as U.S. Pat. Pub. No. US-2006-0050018; Ser. No. 11/226,628, filed Sep. 14, 2005 and published Mar. 23, 2006 as U.S. Pat. Pub. No. US-2006-0061008; Ser. No. 12/091,525, filed Apr. 25, 2008 and published Jan. 15, 2009 as U.S. Pat. Pub. No. US-2009-0015736; Ser. No. 12/091,525, filed Apr. 25, 2008 and published Jan. 15, 2009 as U.S. Pat. Pub. No. US-2009-0015736; Ser. No. 12/578,732, filed Oct. 14, 2009 and published Apr. 22, 2010 as U.S. Pat. Pub. No. US-2010-0097469; Ser. No. 09/585,379, filed Jun. 1, 2000, now abandoned; and/or Ser. No. 10/207,291, filed Jul. 29, 2002, now abandoned, and/or PCT Application No. PCT/US10/47256, filed Aug. 31, 2010 and published Mar. 10, 2011 as International Publication No. WO 2011/028686, which are all hereby incorporated herein by reference in their entireties. Optionally, the video display screen and mirror assembly may utilize aspects of the display systems described in U.S. patent application Ser. No. 13/102,263, filed May 6, 2011 and published Nov. 10, 2011 as U.S. Publication No. US-2011-027359, which is hereby incorporated herein by reference in its entirety.

Optionally, the mirror assembly and/or prismatic or electrochromic reflective element may include one or more displays, such as for the accessories or circuitry described herein. The displays may be of types disclosed in U.S. Pat. Nos. 5,530,240 and/or 6,329,925, which are hereby incorporated herein by reference in their entireties, and/or may be display-on-demand or transflective type displays, such as the types disclosed in U.S. Pat. Nos. 7,338,177; 7,274,501; 7,195,381; 6,690,298; 5,668,663 and/or 5,724,187, and/or in U.S. patent application Ser. No. 11/226,628, filed Sep. 14, 2005 and published Mar. 23, 2006 as U.S. Pat. Pub. No. US-2006-0061008; and/or Ser. No. 12/091,525, filed Jul. 15, 2008 and published Jan. 15, 2009 as U.S. Pat. Pub. No. US-2009-0015736, which are all hereby incorporated herein by reference in their entireties. Optionally, the prismatic reflective element may comprise a display on demand or transflective prismatic element (such as described in U.S. Pat. No. 7,274,501 and/or 7,338,177, which are hereby incorporated herein by reference in their entireties) so that the displays are viewable through the reflective element, while the display area still functions to substantially reflect light, in order to provide a generally uniform prismatic reflective element even in the areas that have display elements positioned behind the reflective element.

The video display screen may be controlled or operable in response to an input or signal, such as a signal received from one or more cameras or image sensors of the vehicle, such as a video camera or sensor, such as a CMOS imaging array sensor, a CCD sensor or the like, such as the types disclosed in U.S. Pat. Nos. 5,550,677; 5,760,962; 6,396,397; 6,097,023; 5,877,897; and 5,796,094, and/or U.S. patent application Ser. No. 10/534,632, filed May 11, 2005 and published Aug. 3, 2006 as U.S. Pat. Pub. No. US-2006-0171704, which are hereby incorporated herein by reference in their entireties, or from one or more imaging systems of the vehicle, such as a reverse or backup aid system, such as a rearwardly directed vehicle vision system utilizing principles disclosed in U.S. Pat. Nos. 5,550,677; 5,760,962; 5,670,935; 6,201,642; 6,396,397; 6,498,620; 6,717,610 and/or 6,757,109, which are hereby incorporated herein by reference in their entireties, a trailer hitching aid or tow check system, such as the type disclosed in U.S. Pat. No. 7,005,974, which is hereby incorporated herein by reference in its entirety, a cabin viewing or monitoring device or system, such as a baby viewing or rear seat viewing camera or device or system or the like, such as disclosed in U.S. Pat. Nos. 5,877,897 and/or 6,690,268, which are hereby incorporated herein by reference in their entireties, a video communication device or system, such as disclosed in U.S. Pat. No. 6,690,268, which is hereby incorporated herein by reference in its entirety, and/or the like. The imaging sensor or camera may be activated and the display screen may be activated in response to the vehicle shifting into reverse, such that the display screen is viewable by the driver and is displaying an image of the rearward scene while the driver is reversing the vehicle.

Optionally, a rear camera, such as a rear backup video camera/imager or the like (such as a camera and system of the types described in U.S. Pat. Nos. 5,550,677; 5,670,935; 6,498,620; 6,222,447; and/or 5,949,331, which are hereby incorporated herein by reference in their entireties), may be disposed at the vehicle and may have a rearward field of view rearward of the vehicle for capturing images rearward of the vehicle such as for driver assistance during a reversing maneuver of the vehicle or the like. Because such a rear camera has a rearward field of view, the rearward facing camera may be operable to capture images of rearwardly approaching or following vehicles that are behind the vehicle equipped with the rearward facing camera when the vehicle so equipped is driving forwardly along the road or highway. It is envisioned that an image processor or controller (such as an EyeQ™ image processing chip available from Mobileye Vision Technologies Ltd. of Jerusalem, Israel, and such as an image processor of the types described in PCT Application No. PCT/US10/25545, filed Feb. 25, 2010 and published Sep. 2, 2010 as International Pub. No. WO/2010/099416, which is hereby incorporated herein by reference in its entirety) may process image data captured by the rearward facing camera to assess glare lighting conditions (such as to detect headlights of following vehicles that may cause glare at the interior and/or exterior rearview mirror assemblies of the equipped vehicle), and the controller may adjust or control the dimming of the electro-optic mirror assembly or assemblies of the equipped vehicle responsive to such image processing. Using principles of the systems described in U.S. Pat. No. 5,550,677, which is hereby incorporated herein by reference in its entirety, the system may operate to independently control any one or more of the interior rearview mirror assembly and the exterior rearview mirror assemblies of the equipped vehicle, such as based on the intensity and location of glare light detected by the camera and image processor. Such a rear reversing or backup camera and controller can also operate to detect the ambient light level present at the vehicle and may adjust the dimming of the mirror system accordingly, and/or may adjust other displays, lighting and/or accessories of the vehicle in accordance with and responsive to the ambient light detection by the rear backup camera (or by other cameras on the vehicle that view exterior to the vehicle). Such glare detection and ambient light detection and image processing of image data captured by a rear backup assist camera of the vehicle may obviate the need for a separate glare sensor elsewhere at the vehicle, such as at or in the interior rearview mirror assembly of the vehicle or the like. Such image processing and such a mirror control system may utilize aspects of the imaging systems described in U.S. Pat. Nos. 5,550,677; 5,670,935; 5,760,962; 6,201, 642; 6,396,397; 6,498,620; 6,097,023; 5,877,897; and 5,796,094, which are hereby incorporated herein by reference in their entireties.

Optionally, the mirror assembly and/or any associated user inputs may be associated with various accessories or systems, such as, for example, a tire pressure monitoring system or a passenger air bag status or a garage door opening system or a telematics system or any other accessory or system of the mirror assembly or of the vehicle or of an accessory module or console of the vehicle, such as an accessory module or console of the types described in U.S. Pat. Nos. 7,289,037; 6,877,888; 6,824,281; 6,690,268; 6,672,744; 6,386,742; and/or 6,124,886, and/or U.S. patent application Ser. No. 10/538,724, filed Jun. 13, 2005 and published Mar. 9, 2006 as U.S. Pat. Pub. No. US-2006-0050018, which are hereby incorporated herein by reference in their entireties.

Optionally, the user inputs or buttons may comprise user inputs for a garage door opening system, such as a vehicle based garage door opening system of the types described in U.S. Pat. Nos. 6,396,408; 6,362,771; 7,023,322; and/or 5,798,688, which are hereby incorporated herein by reference in their entireties. The user inputs may also or otherwise function to activate and deactivate a display or function or accessory, and/or may activate/deactivate and/or commence a calibration of a compass system of the mirror assembly and/or vehicle. The compass system may include compass sensors and circuitry within the mirror assembly or within a compass pod or module at or near or associated with the mirror assembly. Optionally, the user inputs may also or otherwise comprise user inputs for a telematics system of the vehicle, such as, for example, an ONSTAR® system as found in General Motors vehicles and/or such as described in U.S. Pat. Nos. 4,862,594; 4,937,945; 5,131,154; 5,255, 442; 5,632,092; 5,798,688; 5,971,552; 5,924,212; 6,243, 003; 6,278,377; and 6,420,975; 6,477,464; 6,946,978; 7,308,341; 7,167,796; 7,004,593; 7,657,052; and/or 6,678, 614, and/or U.S. patent application Ser. No. 10/538,724, filed Jun. 13, 2005 and published Mar. 9, 2006 as U.S. Pat. Pub. No. US-2006-0050018, which are all hereby incorporated herein by reference in their entireties.

Optionally, the mirror assembly may include one or more other accessories at or within the mirror casing, such as one or more electrical or electronic devices or accessories, such as antennas, including global positioning system (GPS) or cellular phone antennas, such as disclosed in U.S. Pat. No. 5,971,552, a communication module, such as disclosed in U.S. Pat. No. 5,798,688, a blind spot detection system, such as disclosed in U.S. Pat. Nos. 5,929,786 and/or 5,786,772, transmitters and/or receivers, such as a garage door opener or the like, a digital network, such as described in U.S. Pat. No. 5,798,575, a high/low headlamp controller, such as disclosed in U.S. Pat. Nos. 5,796,094 and/or 5,715,093, a memory mirror system, such as disclosed in U.S. Pat. No. 5,796,176, a hands-free phone attachment, a video device for internal cabin surveillance and/or video telephone function, such as disclosed in U.S. Pat. Nos. 5,760,962 and/or 5,877,897, a remote keyless entry receiver, lights, such as map reading lights or one or more other lights or illumination sources, such as disclosed in U.S. Pat. Nos. 6,690,268; 5,938,321; 5,813,745; 5,820,245; 5,673,994; 5,649,756; 5,178,448; 5,671,996; 4,646,210; 4,733,336; 4,807,096; 6,042,253; 5,669,698; 7,195,381; 6,971,775; and/or 7,249, 860, microphones, such as disclosed in U.S. Pat. Nos. 7,657,052; 6,243,003; 6,278,377; and/or 6,420,975, speakers, antennas, including global positioning system (GPS) or cellular phone antennas, such as disclosed in U.S. Pat. No. 5,971,552, a communication module, such as disclosed in U.S. Pat. No. 5,798,688, a voice recorder, a blind spot detection system, such as disclosed in U.S. Pat. Nos. 7,720, 580; 7,038,577; 6,882,287; 5,929,786 and/or 5,786,772, transmitters and/or receivers, such as for a garage door opener or a vehicle door unlocking system or the like (such as a remote keyless entry system), a digital network, such as described in U.S. Pat. No. 5,798,575, a high/low headlamp controller, such as a camera-based headlamp control, such as disclosed in U.S. Pat. Nos. 5,796,094 and/or 5,715,093, a memory mirror system, such as disclosed in U.S. Pat. No. 5,796,176, a hands-free phone attachment, an imaging system or components or circuitry or display thereof, such as an imaging and/or display system of the types described in U.S. Pat. Nos. 7,400,435; 7,526,103; 6,690,268 and/or 6,847,487, and/or U.S. patent application Ser. No. 11/239,980, filed Sep. 30, 2005 and published Jun. 15, 2006 as U.S. Pat. Pub. No. US-2006-0125919, a video device for internal cabin surveillance (such as for sleep detection or driver drowsiness detection or the like) and/or video telephone function, such as disclosed in U.S. Pat. Nos. 5,760,962 and/or 5,877,897, a remote keyless entry receiver, a seat occupancy detector, a remote starter control, a yaw sensor, a clock, a carbon monoxide detector, status displays, such as displays that display a status of a door of the vehicle, a transmission selection (4wd/2wd or traction control (TCS) or the like), an antilock braking system, a road condition (that may warn the driver of icy road conditions) and/or the like, a trip computer, a tire pressure monitoring system (TPMS) receiver (such as described in U.S. Pat. Nos. 6,124,647; 6,294,989; 6,445,287; 6,472,979; 6,731,205; and/or 7,423,522, and/or an ONSTAR® system, a compass, such as disclosed in U.S. Pat. Nos. 5,924,212; 4,862,594; 4,937,945; 5,131,154; 5,255,442; and/or 5,632,092, and/or any other accessory or circuitry or the like (with all of the above-referenced patents and PCT and U.S. patent applications being commonly assigned to Donnelly Corporation and being hereby incorporated herein by reference in their entireties).

Optionally, the mirror assembly (such as at the mounting base, which may be fixed relative to the vehicle windshield) may include an imaging sensor (such as a forward facing imaging sensor or camera that has a forward field of view through the vehicle windshield) that may be part of or may provide an image output for a vehicle vision system, such as a headlamp control system or lane departure warning system or object detection system or other vehicle vision system or the like, and may utilize aspects of various imaging sensors or imaging array sensors or cameras or the like, such as a CMOS imaging array sensor, a CCD sensor or other sensors or the like, such as the types described in U.S. Pat. Nos. 5,550,677; 5,670,935; 5,760,962; 5,715,093; 5,877,897; 6,922,292; 6,757,109; 6,717,610; 6,590,719; 6,201,642; 6,498,620; 5,796,094; 6,097,023; 6,320,176; 6,559,435; 6,831,261; 6,806,452; 6,396,397; 6,822,563; 6,946,978; 7,038,577; 7,004,606; and/or 7,720,580, and/or U.S. patent application Ser. No. 10/534,632, filed May 11, 2005 and published Aug. 3, 2006 as U.S. Patent Publication No. US-2006-0171704; Ser. No. 12/091,359, filed Jun. 10, 2008 and published Oct. 1, 2009 as U.S. Pat. Pub. No. US-2009-0244361; and/or Ser. No. 12/377,054, filed Feb. 10, 2009 and published Aug. 26, 2010 as U.S. Pat. Pub. No. US-2010-0214791, and/or PCT Application No. PCT/US08/78700, filed Oct. 3, 2008 and published Apr. 9, 2009 as International Publication No. WO 2009/046268, and/or PCT Application No. PCT/US08/76022, filed Sep. 11, 2008 and published Mar. 19, 2009 as International Publication No. WO 2009/036176, which are all hereby incorporated herein by reference in their entireties. The sensor may include a lens element or optic between the imaging plane of the imaging sensor and the forward scene to substantially focus the scene at an image plane of the imaging sensor. The imaging sensor may comprise an image sensing module or the like, and may utilize aspects described in U.S. patent application Ser. No. 10/534,632, filed May 11, 2005 and published Aug. 3, 2006 as U.S. Pat. Pub. No. US-2006-0171704; and/or Ser. No. 12/091,359, filed Oct. 27, 2006 and published Oct. 1, 2009 as U.S. Pat. Pub. No. US-2009-0244361, which are hereby incorporated herein by reference in their entireties.

Optionally, the accessory or accessories, such as those described above and/or below, may be positioned at or within the mirror casing and/or mirror cap portion or the like, and may be included on or integrated in a printed circuit board positioned within the mirror casing and/or cap portion, such as along a rear surface of the reflective element or elsewhere within a cavity defined by the casing, without affecting the scope of the present invention. The user actuatable inputs and/or touch sensors and/or proximity sensors and displays described above may be actuatable to control and/or adjust the accessories of the mirror assembly/system and/or overhead console and/or accessory module and/or vehicle. The connection or link between the controls and the display screen device and/or the navigation system and/or other systems and accessories of the mirror system may be provided via vehicle electronic or communication systems and the like, and may be connected via various protocols or nodes, such as BLUETOOTH®, SCP, UBP, J1850, CAN J2284, Fire Wire 1394, MOST, LIN, FlexRay™, Byte Flight and/or the like, or other vehicle-based or in-vehicle communication links or systems (such as WIFI and/or IRDA) and/or the like, or via VHF or UHF or other wireless transmission formats, depending on the particular application of the mirror/accessory system and the vehicle. Optionally, the connections or links may be provided via various wireless connectivity or links, without affecting the scope of the present invention.

Changes and modifications in the specifically described embodiments may be carried out without departing from the principles of the present invention, which is intended to be limited only by the scope of the appended claims as interpreted according to the principles of patent law.

The invention claimed is:

1. An interior rearview mirror assembly for a vehicle, said interior rearview mirror assembly comprising:
    a mirror reflective element;
    a rear mirror casing;
    a mirror backplate;
    wherein said mirror backplate includes a generally planar attachment portion at a front of said mirror backplate for attaching at a rear surface of said mirror reflective element and includes a pivot element at a rear of said mirror backplate for pivotally mounting said interior rearview mirror assembly at an interior portion of the vehicle, and wherein said pivot element and said generally planar attachment portion are integrally formed via injection molding of a polymeric material to establish a unitary mirror backplate;
    wherein said pivot element comprises a socket element for receiving a ball member of a mirror mounting assembly;
    wherein said mirror backplate comprises a perimeter flange extending substantially around a perimeter of said generally planar attachment portion and extending rearward therefrom, wherein said perimeter flange is disposed along and extends rearward of a perimeter edge region of said mirror reflective element when said generally planar attachment portion of said backplate is attached at said rear surface of said mirror reflective element;

wherein said rear mirror casing comprises a forward perimeter lip extending substantially around a perimeter of said rear mirror casing and a plurality of attaching elements at said forward perimeter lip that are configured to engage respective attaching elements established at said perimeter flange;

wherein said forward perimeter lip of said rear mirror casing receives said perimeter flange of said mirror backplate therein, and wherein said plurality of attaching elements at said forward perimeter lip engage respective attaching elements at said perimeter flange to attach said perimeter flange and said mirror backplate and said mirror reflective element at said rear mirror casing; and wherein said rear mirror casing has an aperture for receiving the ball member of the mirror mounting assembly therethrough when said socket element is pivotally attached at the ball member of the mirror mounting assembly.

2. The interior rearview mirror assembly of claim 1, comprising a front casing portion configured to at least partially receive a front portion of said perimeter flange of said mirror backplate and configured to attach to said perimeter flange.

3. The interior rearview mirror assembly of claim 2, wherein said attaching elements of said perimeter flange comprise a plurality of apertures established at said perimeter flange, and wherein said front casing portion comprises a plurality of tabs that are received in respective apertures established at said perimeter flange to attach said front casing portion to said mirror backplate.

4. The interior rearview mirror assembly of claim 3, wherein said attaching elements of rear mirror casing comprise a plurality of tabs, and wherein said tabs are received in respective apertures established at said perimeter flange of said mirror backplate to attach said rear mirror casing to said mirror backplate.

5. The interior rearview mirror assembly of claim 1, wherein said attaching elements of said rear mirror casing comprise a plurality of tabs and wherein said attaching elements of said perimeter flange comprise a plurality of apertures established at said perimeter flange, and wherein said tabs are received in respective apertures established at said perimeter flange of said mirror backplate to attach said rear mirror casing to said mirror backplate.

6. The interior rearview mirror assembly of claim 1, comprising a perimeter lighting device operable to illuminate at least one of (i) a perimeter region of said rear mirror casing and (ii) a perimeter region of said mirror reflective element, wherein said perimeter lighting device comprises at least one illumination source and a light directing element configured to direct light emitted by said at least one illumination source generally toward said at least one of (i) a perimeter region of said rear mirror casing and (ii) a perimeter region of said mirror reflective element.

7. An interior rearview mirror assembly for a vehicle, said interior rearview mirror assembly comprising:

a mirror reflective element;

a front mirror casing portion configured to receive said mirror reflective element and circumscribe a perimeter edge of said mirror reflective element, wherein said front mirror casing portion comprises a plurality of attaching elements disposed at or near a rearward perimeter lip of said front mirror casing portion;

a rear mirror casing portion, wherein said rear mirror casing portion comprises a plurality of attaching elements disposed at or near a forward perimeter lip of said rear mirror casing portion;

a mirror backplate;

wherein said mirror backplate includes a generally planar attachment portion that attaches at a rear surface of said mirror reflective element and includes a perimeter flange circumscribing a perimeter of said generally planar attachment portion at or near said perimeter edge of said mirror reflective element and extending rearward therefrom; and wherein said perimeter flange is partially received in said forward perimeter lip of said rear mirror casing portion and partially received in said rearward perimeter lip of said front mirror casing portion, and wherein said perimeter flange includes a plurality attaching elements spaced along said perimeter flange of said mirror backplate, and wherein said attaching elements of said front and rear mirror casing portions engage said attaching elements of said perimeter flange of said mirror backplate to position said mirror backplate and said mirror reflective element between said front and rear mirror casing portions.

8. The interior rearview mirror assembly of claim 7, wherein said attaching elements of said rear mirror casing portion comprise a plurality of tabs and wherein said attaching elements of said perimeter flange comprise a plurality of apertures established at said perimeter flange, and wherein said tabs are snapped into the respective apertures established at said perimeter flange to attach said rear mirror casing portion to said mirror backplate.

9. The interior rearview mirror assembly of claim 8, wherein said attaching elements of said front mirror casing portion comprise a plurality of tabs that are received in respective apertures established at said perimeter flange to attach said front mirror casing portion to said mirror backplate.

10. The interior rearview mirror assembly of claim 7, wherein said rear mirror casing portion comprises a forward opening circumscribed by said forward perimeter lip for partially receiving said perimeter flange and said front mirror casing portion comprises a rearward opening circumscribed by said rearward perimeter lip for partially receiving said perimeter flange, and wherein said forward perimeter lip of said rear mirror casing portion is configured to mate with said rearward perimeter lip of said front mirror casing portion when said perimeter flange couples said front and rear mirror casing portions to said mirror backplate.

11. The interior rearview mirror assembly of claim 10, wherein said forward perimeter lip of said rear mirror casing portion and said rearward perimeter lip of said front mirror casing portion are configured to limit movement of said front mirror casing portion relative to said rear mirror casing portion when said front and rear mirror casing portions are coupled to said mirror backplate.

12. The interior rearview mirror assembly of claim 7, wherein said mirror backplate includes a pivot element for pivotally mounting said interior rearview mirror assembly at an interior portion of the vehicle, wherein said pivot element is aligned with an aperture in said rear mirror casing for at least one of said pivot element and a mirror mounting assembly to extend through the aperture in said rear mirror casing, and wherein said pivot element and said generally planar attachment portion and said perimeter flange are integrally formed via injection molding of a polymeric material to establish a unitary mirror backplate.

13. The interior rearview mirror assembly of claim 7, comprising a perimeter lighting device disposed at least partially about a periphery of said mirror reflective element and operable to illuminate at least one of (i) a perimeter region of said front mirror casing portion and (ii) a perimeter region of said mirror reflective element.

14. The interior rearview mirror assembly of claim 9, wherein said apertures at said perimeter flange commonly receive said tabs of said front casing portion and said tabs of said rear mirror casing portion.

15. The interior rearview mirror assembly of claim 14, wherein said perimeter flange comprises an outer surface that generally corresponds with and engages an inner surface of said rear mirror casing portion when said rear mirror casing portion at least partially receives said perimeter flange and attaches to said perimeter flange.

16. The interior rearview mirror assembly of claim 7, wherein said perimeter flange is integrally formed with said generally planar attachment portion via injection molding of a polymeric material to establish a unitary mirror backplate.

17. The interior rearview mirror assembly of claim 1, wherein said perimeter flange is integrally formed with said pivot element and said generally planar attachment portion via injection molding of the polymeric material to establish said unitary mirror backplate.

18. The interior rearview mirror assembly of claim 17, wherein said attaching elements of said rear mirror casing comprise a plurality of tabs and wherein said attaching elements of said perimeter flange comprise a plurality of apertures established at said perimeter flange, and wherein said tabs are received in respective apertures established at said perimeter flange of said mirror backplate to attach said rear mirror casing to said mirror backplate.

19. The interior rearview mirror assembly of claim 18, comprising a front casing portion configured to at least partially receive a front portion of said perimeter flange of said mirror backplate and configured to attach to said perimeter flange, wherein said front casing portion comprises a plurality of tabs that are received in respective apertures established at said perimeter flange to attach said front casing portion to said mirror backplate.

20. The interior rearview mirror assembly of claim 19, wherein said apertures commonly receive said tabs of said front casing portion and said tabs of said rear casing portion.

21. The interior rearview mirror assembly of claim 20, wherein said perimeter flange comprises an outer surface that generally corresponds with and engages an inner surface of said rear mirror casing when said rear mirror casing at least partially receives said perimeter flange and attaches to said perimeter flange.

\* \* \* \* \*

UNITED STATES PATENT AND TRADEMARK OFFICE
CERTIFICATE OF CORRECTION

PATENT NO. : 9,475,431 B2  
APPLICATION NO. : 13/644593  
DATED : October 25, 2016  
INVENTOR(S) : Brummel et al.

Page 1 of 1

It is certified that error appears in the above-identified patent and that said Letters Patent is hereby corrected as shown below:

In the Specification

Column 18  
Line 21, "US-2011-027359" should be --US-2011-0273659--

Signed and Sealed this  
Eighteenth Day of April, 2017

Michelle K. Lee  
*Director of the United States Patent and Trademark Office*